United States Patent
Hemminghaus et al.

(10) Patent No.: US 12,193,437 B2
(45) Date of Patent: *Jan. 14, 2025

(54) PESTICIDAL COMPOSITIONS

(71) Applicant: Monsanto Technology LLC, St. Louis, MO (US)

(72) Inventors: John W. Hemminghaus, St. Louis, MO (US); Neha Rana, Chesterfield, MO (US); Ashoke K. SenGupta, Wentzville, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/406,371

(22) Filed: Aug. 19, 2021

(65) Prior Publication Data

US 2022/0039374 A1 Feb. 10, 2022

Related U.S. Application Data

(62) Division of application No. 16/317,433, filed as application No. PCT/US2017/041767 on Jul. 12, 2017, now Pat. No. 11,116,208.

(60) Provisional application No. 62/361,142, filed on Jul. 12, 2016.

(51) Int. Cl.
| | | |
|---|---|---|
| *A01N 25/04* | (2006.01) | |
| *A01N 37/26* | (2006.01) | |
| *A01N 37/40* | (2006.01) | |
| *A01N 43/38* | (2006.01) | |

(52) U.S. Cl.
CPC ............ *A01N 25/04* (2013.01); *A01N 37/26* (2013.01); *A01N 37/40* (2013.01); *A01N 43/38* (2013.01)

(58) Field of Classification Search
None
See application file for complete search history.

(56) References Cited

U.S. PATENT DOCUMENTS

| | | | |
|---|---|---|---|
| 3,320,136 | A | 5/1967 | Zajie |
| 4,870,103 | A | 9/1989 | Roechling et al. |
| 4,946,606 | A | 8/1990 | Osterloh |
| 4,995,900 | A | 2/1991 | Futcher |
| 5,110,591 | A | 5/1992 | Williams |
| 5,444,078 | A | 8/1995 | Yu et al. |
| 5,811,383 | A | 9/1998 | Klier et al. |
| 6,165,939 | A | 12/2000 | Agbaje et al. |
| 6,340,653 | B1 | 1/2002 | Scher et al. |
| 6,369,001 | B1 | 9/2002 | Jimoh |
| 6,713,433 | B2 | 3/2004 | Jimoh |
| 7,135,437 | B2 | 11/2006 | Pallas et al. |
| 8,076,268 | B2 | 12/2011 | Schnabel et al. |
| 8,252,719 | B2 | 8/2012 | Douglass et al. |
| 8,333,982 | B2 | 12/2012 | Taranta et al. |
| 2003/0004063 | A1* | 1/2003 | Jimoh ................ A01N 43/40 504/130 |
| 2003/0087764 | A1 | 5/2003 | Pallas et al. |
| 2003/0153461 | A1 | 8/2003 | Parrish et al. |
| 2004/0132621 | A1 | 7/2004 | Frisch et al. |
| 2005/0215434 | A1 | 9/2005 | Ruiz et al. |
| 2006/0194699 | A1 | 8/2006 | Moucharafieh et al. |
| 2010/0234227 | A1 | 9/2010 | Maier |
| 2010/0234230 | A1* | 9/2010 | Fowler .................. A01N 37/22 504/342 |
| 2012/0065068 | A1 | 3/2012 | Downer et al. |
| 2012/0129694 | A1 | 5/2012 | Ditmarsen et al. |
| 2012/0142532 | A1 | 6/2012 | Wright et al. |
| 2013/0157855 | A1 | 6/2013 | Zhang et al. |
| 2014/0005052 | A1 | 1/2014 | Blumel |
| 2014/0128264 | A1 | 5/2014 | Hemminghaus et al. |
| 2014/0378554 | A1 | 12/2014 | Sexton et al. |
| 2015/0252249 | A1 | 9/2015 | Hill et al. |
| 2016/0050919 | A1 | 2/2016 | Byrne et al. |
| 2016/0192645 | A1 | 7/2016 | Zhang et al. |

FOREIGN PATENT DOCUMENTS

| | | | |
|---|---|---|---|
| CA | 1209361 | A1 | 8/1986 |
| CA | 2510028 | A1 | 7/2004 |
| CN | 1433685 | A | 8/2003 |
| CN | 101984810 | A * | 3/2011 |
| EP | 0206987 | A | 12/1986 |

(Continued)

OTHER PUBLICATIONS

Elinevskaya L S, Neborako D N, Nexterova L M, Uskov A M; Herbidde composition and undesirable vegetation control method; WPI /2017 Clarivate Analytics, 2008'1'1'10; vol. 20-J4, Nr: 75
Filatov A P, Kolbin A M, Logvin B 0, Meyzler B I, Semenova G E, Valitov RB, Valitov RR, Zaripov RV; Herbicidal microemulsion composition includes optionally 2,4-dichforophenoxyacetic acid ester, trialkylamine or oxyethylated alkylamine salt of 2,4-dichlorophenoxyacetic acid and trialkylamine or oxyethylated alkylamine salt of florasulam; :WPI/ 20H Clarivate Analytics, 20-140727; vol. 20-J4, Nr: 65
Komesvarakul, N., et al., "Microemulsions of Triglyceride-based Oils: The Effect of Co-Oil and Salinity on Phase Diagrams," Jul./Aug. 2006, J Cosmet Sci, 55:309-325, 17 pages.
Mehta, S.K., et al., "Microemulsions: Thermodynamic and Dynamic Properties," 2011, Thermodynamics, Prof. M. Tadashi, Ed., ISBN: 978-953-307-544-0, http://www.intechopen.com/books/thermodynamics/microemulsions-thermodynamic-and-dynamic-properties, 27 pages.

(Continued)

*Primary Examiner* — Alton N Pryor
(74) *Attorney, Agent, or Firm* — Harness, Dickey & Pierce, P.L.C.

(57) ABSTRACT

Non-water-continuous pesticidal microemulsions are described as well as methods of preparing these microemulsions and methods of using these microemulsions to prepare pesticidal application mixtures that are oil-in-water (O/W) macroemulsions. Herbicidal concentrate compositions having a high loading of an auxin herbicide are also described along with methods of preparing these concentrate compositions, and methods of using these concentrate compositions in preparing certain non-water-continuous herbicidal microemulsion compositions. Further, various herbicidal compositions having improved chemical stability and extended residual weed control are described.

15 Claims, No Drawings

(56) References Cited

FOREIGN PATENT DOCUMENTS

| | | | |
|---|---|---|---|
| EP | 0480902 | A1 | 4/1992 |
| GB | 2022418 | A1 | 12/1979 |
| RU | 2337545 | C1 | 11/2008 |
| RU | 2523848 | C1 | 7/2014 |
| WO | 94/23012 | A1 | 10/1994 |
| WO | 98/04761 | A1 | 2/1998 |
| WO | 01/22814 | A1 | 4/2001 |
| WO | 01/52650 | A2 | 7/2001 |
| WO | 03/105587 | A1 | 12/2003 |
| WO | 2007073933 | A | 7/2007 |
| WO | 2008017377 | A3 | 2/2008 |
| WO | 2009/013120 | A2 | 1/2009 |
| WO | 2011019652 | A2 | 2/2011 |
| WO | 2011/086576 | A2 | 7/2011 |
| WO | 2011082162 | A1 | 7/2011 |
| WO | 2011/113052 | A2 | 9/2011 |

OTHER PUBLICATIONS

Monnoyer, P., et al., "Chemical and Physical Processes for Nano Particle Synthesis ," 1995, Colloid Surf A 100:233-243, 11 pages.

International Preliminary Report on Patentability issued Jan. 24, 2019 in International PCT Application No. PCT/US2017/41767, 14 pages.

International Search Report and Written Opinion issued Nov. 9, 2017 in International PCT Application No. PCT/US2017/41767, 18 pages.

"Chapter 7.1. Performance Blends for Emulsification," Sep. 1, 2009, Agro Applications, Akzo Nobel NV, Amsterdam, The Netherlands, XP55642484, 7 pages.

"Chapter 7.2. Performance Blends APE-Free Product Listing" Sep. 1, 2011, Agro Applications, Akzo Nobel NV, Amsterdam, The Netherlands, XP55642415, 3 pages.

"ClarityTM Herbicide", Jan. 1, 2010, pp. 1-22, XP055871016.

\* cited by examiner

PESTICIDAL COMPOSITIONS

REFERENCE TO RELATED APPLICATIONS

The present application is a division of U.S. patent application Ser. No. 16/317,433, filed Jan. 11, 2019, which is the 371 National Stage Application of International Patent Application Serial No. PCT/US2017/041767, filed Jul. 12, 2017, which claims the benefit of U.S. Provisional Application Ser. No. 62/361,142, filed Jul. 12, 2016, the entire contents of which are incorporated herein by reference

FIELD OF THE INVENTION

The present invention relates to pesticidal microemulsion compositions having a microstructure that is non-water-continuous. The present invention further relates to methods of preparing these microemulsion compositions, and methods of using these microemulsion compositions to prepare pesticidal application mixtures that are oil-in-water (O/W) macroemulsions. The present invention also relates to herbicidal concentrate compositions having a high loading of an auxin herbicide, methods of preparing these concentrate compositions, and methods of using these concentrate compositions in preparing certain non-water-continuous herbicidal microemulsion compositions. Further, the present invention relates to various herbicidal compositions having improved stability and methods to prepare these compositions. Still further, the present invention relates to herbicidal compositions and related methods for extending residual weed control.

BACKGROUND OF THE INVENTION

To enhance the efficiency of applying pesticidal active ingredients, it is highly desirable to combine two or more active ingredients in a single formulation. Applying a combination of active ingredients with different modes of action can provide for greater pest control. Also, concentrate compositions containing high loadings of active ingredients are more economical to transport and store. Concentrate compositions containing high loadings of multiple active ingredients (i.e., pre-mix concentrates) are also beneficial in avoiding or reducing mixing errors when preparing the application mixture in the field.

Pesticidal compositions generally contain pesticides that are either hydrophilic, water-soluble compounds or lipophilic, oil-dissolvable compounds. Combining an aqueous solution of a water-soluble, hydrophilic pesticide with an oily or an oil-soluble, hydrophobic pesticide can necessitate formulating the mixture as either a water-continuous, oil-in-water (O/W) emulsion or an oil-continuous water-in-oil (W/O) emulsion. The use of polymers and surfactants as emulsifiers and suspending agents in these mixtures is generally sufficient to stabilize emulsion droplets against flocculation, coalescence, and sedimentation, so long as the continuous phase of the emulsion is an adequate solvent for the polymers and surfactants.

Many water-soluble pesticides such as auxin herbicides are ionic. When attempting to combine a relatively high loading of an oily or oil-dissolvable pesticide with a relatively high loading of an ionic pesticide in an oil-in-water emulsion, the aqueous phase can form a high ionic strength liquid (for example, with an ionic strength of greater than 0.35 M). However, a high ionic strength liquid is typically a poor solvent for polymeric emulsifiers and suspending agents, which are often preferred for their higher effectiveness over lower molecular-weight surfactants. An ionic polymeric emulsifier may even exhibit poor-solvency in a moderately high ionic-strength liquid (e.g., around 0.35 M), depending on its ionic charge-density, molecular weight, and hydrophilic-lipophilic balance, whereas higher ionic-strength liquids (e.g., 0.75 M) can be a poor solvent for even non-ionic polymers, especially under heating or cooling. In fact, a polymeric emulsifier can switch from being a stabilizer to a flocculant when the dispersion medium (i.e., continuous phase) is a poor solvent for the polymer. Furthermore, a moderately high-ionic-strength aqueous phase may render a stabilizing mechanism, such as electrical double layer repulsion between dispersed particles due to ionic stabilizer moieties, virtually ineffective. Thus, formulating a stable oil-in-water emulsion when the dispersed phase contains a high loading of an oily or oil-dissolvable pesticide and the continuous phase contains a high loading of an ionic pesticide can be highly problematic.

Formulating oil-continuous emulsions could be a way of combining relatively high loadings of lipophilic and ionic pesticides while circumventing the difficulties noted above. However, ordinary emulsions, referred to herein as macroemulsions, having a droplet size of 1 micron or higher, generally require a suspending agent to provide stability against sedimentation (i.e., creaming or settling) of the dispersed phase. The water-soluble polymeric suspending agents that are capable of providing for a high low-shear-rate (e.g., zero-shear-rate) viscosity are generally effective in water-continuous dispersions, unless the ionic strength of the aqueous continuous phase is substantially high (e.g., >0.35 M). However, highly effective suspending agents for oil-continuous dispersions are not known.

Furthermore, because of their typical use in bulk quantities, pesticidal compositions must be highly stable against sedimentation (since re-dispersion of any settled mass is difficult for any bulk quantity of a formulation), while having a low apparent viscosity (i.e., high-shear-rate viscosity) so that they can be easily dispensed. Obtaining contrasting rheological properties such as having a high low-shear-rate viscosity (for high stability) along with a low high-shear-rate-viscosity (for high flowability) is challenging, and attaining a formulation having sub-optimal properties invariably leads to compromised levels of stability and flowability. Also, pesticidal compositions must be sufficiently stable so that the pesticides do not degrade to a significant degree during storage.

In view of these problems, there remains a need for effective strategies of formulating stable pesticidal compositions having high loadings of fdiluenic, oil-dissolvable and ionic pesticides. Furthermore, there remains a need for formulation strategies that ensure that these pesticidal compositions can be formulated such that the bioavailability of the pesticide is not compromised.

SUMMARY OF THE INVENTION

In one embodiment, the present invention relates to pesticidal microemulsion compositions comprising (a) an oil phase comprising a lipophilic component; (b) an aqueous phase comprising an aqueous solution comprising a salt of a weak-acid, ionic pesticide; and (c) a stabilizing surfactant comprising an oil-soluble or oil-dispersible anionic surfactant, wherein the microemulsion has a microstructure that is non-water-continuous.

The present invention also relates to methods for controlling weeds in a field of crop plants comprising mixing water with the non-water-continuous pesticidal microemulsion composition to form a pesticidal application mixture, wherein the salt of the weak-acid, ionic pesticide comprises a salt of a weak-acid, ionic herbicide and the pesticidal application mixture is an oil-in-water macroemulsion; and applying the pesticidal application mixture to the field in an herbicidally effective amount.

In another embodiment, the present invention relates to herbicidal concentrate compositions and methods of preparing these compositions. Generally, the herbicidal concentrate compositions comprise an auxin herbicide component comprising an anion of an auxin herbicide and a salt-forming cation; water; and an alkylene glycol, wherein the concentration of the auxin herbicide on an acid equivalent basis is at least about 40 wt. % or at least about 45 wt. %. Various methods of preparing the herbicidal concentrate compositions comprise mixing an auxin herbicide acid, a base, water, and an alkylene glycol to form the herbicidal concentrate composition.

The present invention is also directed to various methods of preparing the non-water-continuous pesticidal microemulsion compositions. Some methods comprise mixing an oil phase comprising the lipophilic component with the stabilizing surfactant comprising the oil-soluble or oil-dispersible anionic surfactant to form an oil phase mixture; and mixing the aqueous solution comprising the salt of the weak-acid, ionic pesticide into the oil phase mixture to form the non-water-continuous pesticidal microemulsion composition. Other methods comprise mixing an oil phase comprising the lipophilic component with the stabilizing surfactant comprising the oil-soluble or oil-dispersible anionic surfactant to form an oil phase mixture; mixing an auxin herbicide acid, a base, water, and an alkylene glycol to form a herbicidal concentrate composition; and mixing the herbicidal concentrate composition or dilution thereof into the oil phase mixture to form the non-water-continuous herbicidal microemulsion composition. Further methods comprise mixing an oil phase comprising the lipophilic component with the stabilizing surfactant comprising the oil-soluble or oil-dispersible anionic surfactant to form an oil phase mixture; and mixing the herbicidal concentrate composition or dilution thereof into the oil phase mixture to form the non-water-continuous herbicidal microemulsion composition.

In a further embodiment, the present invention is also directed to various herbicidal compositions comprising:
an oil phase comprising an acetamide herbicide; and
an aqueous phase comprising an aqueous solution comprising an auxin herbicide component comprising an anion of an auxin herbicide and a salt-forming cation, wherein the composition further includes one or more of the following features:
(i) a pH that is no greater than about 6, no greater than about 5.5, no greater than about 5, or no greater than 4.5;
(ii) a 1 wt. % auxin herbicide acid equivalent dilution of the composition has a pH that is no greater than about 4, no greater than about 3.75, or no greater than about 3.5;
(iii) a molar ratio of the salt-forming cation to the anion of the auxin herbicide that is no greater than about 0.8:1, no greater than about 0.75:1, no greater than about 0.7:1, no greater than about 0.65:1, no greater than about 0.6:1, no greater than about 0.55:1, no greater than about 0.5:1; no greater than about 0.45:1, no greater than about 0.4:1, no greater than about 0.35:1, no greater than about 0.3:1, no greater than about 0.25:1, or no greater than about 0.2:1;
(iv) an alkylene glycol; and/or
(v) an organic acetamide herbicide diluent and wherein the weight ratio of acetamide herbicide to the organic acetamide herbicide diluent is at least about 1:10; at least about 1:5, at least about 1:2, at least about 1:1, at least about 2:1, at least about 3:1, or at least about 4:1.

Other embodiments of the present invention are directed to a herbicidal composition comprising an auxin herbicide acid and an alkylene glycol. In a still further embodiment, the present invention is also directed to various herbicidal compositions comprising an oil phase comprising an acetamide herbicide; and an aqueous phase comprising an aqueous solution comprising an auxin herbicide component comprising an anion of an auxin herbicide and a salt-forming cation; and a cationic flocculant polymer.

Other objects and features will be in part apparent and in part pointed out hereinafter.

DESCRIPTION OF THE PREFERRED EMBODIMENTS

The present invention relates to non-water-continuous pesticidal microemulsion compositions, methods of preparing these microemulsion compositions, and methods of using these microemulsion compositions to prepare pesticidal application mixtures that are water-continuous, oil-in-water macroemulsions. The present invention also relates to herbicidal concentrate compositions having a high loading of an auxin herbicide, methods of preparing these concentrate compositions, and methods of using these concentrate compositions in preparing certain non-water-continuous herbicidal microemulsion compositions.

Aspects of the present invention are directed to providing stable liquid pesticidal microemulsion compositions containing relatively high loadings of both ionic and oily or oil-dissolvable pesticides while having low apparent viscosities. Pesticidal compositions having low apparent viscosities are more readily dispensed and mixed as compared to higher viscosity compositions.

Other aspects of the present invention include providing stable liquid pesticidal microemulsion compositions containing relatively high loadings of both ionic and oily or oil-dissolvable pesticides but still exhibiting a relatively low surfactant demand A pesticidal composition requiring a relatively low surfactant demand is less costly to formulate and can have a lower viscosity as compared to compositions with higher surfactant content. Furthermore, a high concentration of surfactants effectively reduces the amount of pesticidal active ingredients that can be incorporated.

Further aspects of the present invention include providing pesticidal microemulsion compositions that are thermodynamically stable over an extended period of time and broad temperature range. Pesticidal compositions can be exposed to elevated and/or below-freezing temperatures during storage and transportation. Therefore, providing a pesticidal composition that is stable over a wide range of temperatures, such as high as 40° C. to 54° C. or as low as −5° C. to −20° C., is highly advantageous.

Other aspects of the present invention include providing pesticidal microemulsion compositions that are stable against compositional changes due to chemical degradation of ingredients such as the pesticidal active ingredients and surfactants. Providing a chemically stable pesticidal composition advantageously enables maintaining the efficacy of the composition over prolonged storage and varying temperature conditions.

The end-use application of concentrated pesticidal microemulsion compositions generally requires dilution of the composition with water prior to application. Accordingly, further aspects of the present invention are directed to providing pesticidal microemulsion compositions containing relatively high loadings of pesticides that can be diluted with water and readily invert to form water-continuous, oil-in-water macroemulsions. Non-water-continuous pesticidal microemulsion compositions that readily invert upon sufficient dilution do not require high-shear mixing for emulsification. Also, inversion of the microemulsion to a macroemulsion application mixture is advantageous because larger macroemulsion droplets can be more efficacious than the fine droplets of a microemulsion, due to a higher bioavailability. For example, in the case of herbicidal application mixtures, smaller microemulsion droplets might have a tendency to be flushed through soil pores by rain and/or watering more readily than macroemulsion droplets. As a result, microemulsion droplets could show lower weed-control efficacy than macroemulsion droplets due to the reduced availability of herbicides in the top few inches of soil where plant seeds germinate. Unlike a non-water-continuous herbicidal microemulsion, a water-continuous herbicidal microemulsion can remain as a microemulsion, rather than a water-continuous macroemulsion, when diluted with sufficient water for preparing an herbicide application mixture.

Still further aspects of the present invention include providing pesticidal microemulsion compositions comprising ionic pesticides to potentially enhance efficacy of the ionic pesticide. For example, in the case of weed control, weed cuticles covering the epidermis of leaves consists of lipid and lipophilic polymers impregnated with wax. In post-emergence control of unwanted weeds, the efficacy of an herbicide typically relies on foliar uptake of the herbicide by the weed. The lipophilic constitution of the cuticle may hinder the diffusion of hydrophilic, ionic herbicides into the weed. Therefore, a potential benefit of formulating an ionic herbicide in a non-water-continuous microemulsion is that the lipophilic, oily constituents of the microemulsion could solubilize some of the lipophilic constituents of the cuticle. Solubilization of cuticle constituents could weaken the structural integrity of the lipophilic film on the leaf surface, thus enhancing foliar uptake of ionic herbicides.

Still other aspects of the present invention include pesticidal microemulsion compositions comprising ionic pesticides that provide for pesticidal application mixtures exhibiting reduced spray drift. Wide-spread dissemination or drifting of a sprayed pesticidal application mixture could result in application of the pesticide to an off-target area. For example, in the case of herbicides, spray drift could result in injury of a sensitive crop located proximate to an area under treatment. However, lipophilic components of a non-water-continuous microemulsion which are present in the herbicidal application mixture can potentially reduce spray drift.

Additional aspects of the present invention include herbicidal concentrate compositions having a high loading of an auxin herbicide. Herbicidal concentrate compositions having an increased herbicide loading are beneficial because the storage space that would otherwise be required for more dilute compositions is reduced. The smaller volume reduces space required to store and transport the concentrate composition prior to sale or use in the preparation of other pesticidal mixtures.

As noted, the present invention includes non-water-continuous pesticidal microemulsion compositions. As used throughout herein, non-water-continuous pesticidal microemulsion compositions refer to microemulsions that are either oil-continuous or bicontinuous. In other words, non-water-continuous pesticidal microemulsion compositions do not include compositions that are entirely water-continuous. In general, the non-water-continuous pesticidal microemulsion compositions of the present invention favor formation of the oil-continuous microemulsion-microstructure by virtue of the type of stabilizing surfactant(s) and/or the overall composition. Accordingly, these pesticidal microemulsion compositions can be oil-continuous either as prepared, or when they are diluted with a sufficient volume of their oil phase, for example, with an amount that is about 0.5 to about 1 times the volume of the microemulsion composition.

Microemulsions are thermodynamically stable and are substantially optically isotropic form of emulsions of two immiscible liquids, for example, oil and water, typically stabilized by one or more stabilizing surfactants. Visually they appear as optically-transparent, homogeneous mixtures of the constituent immiscible liquids, wherein one liquid can remain dispersed in the other liquid, as droplets as small as about 3 to about 20 nm. A microemulsion can have a microstructure, referred to herein as microemulsion-microstructure, which can be an oil-continuous microstructure, a water-continuous microstructure, or a bicontinuous microstructure. For both oil-continuous and water-continuous microemulsions, the microemulsion-microstructure is that of droplets or globules of the dispersed phase in a continuous phase of either oil or water. On the other hand, a bicontinuous microemulsion does not have a globular microemulsion-microstructure, but rather a channel-like microemulsion-microstructure of interspersed domains of oil and aqueous phases. Microemulsion-microstructures can be analyzed using electron-microscopy-based techniques including Cryo-(Freeze-fracture) Transmission Electron Microscopy, Field Emission Scanning Electron Microscopy, and Cryo-Field Emission Scanning Electron Microscopy.

One distinguishing feature between oil-continuous and water-continuous microemulsions is that the electrical conductivity (i.e., Specific Conductance) of an oil-continuous microemulsion can be as low as on the order of about $10^{-6}$ to about $10^{-4}$ $Sm^{-1}$, which can be an order of magnitude or much lower than that of a water-continuous microemulsion, until reaching the percolation threshold, depending on the volumetric amount of the aqueous dispersed phase contained therein. In terms of electrical resistance, oil-continuous microemulsions can have a relatively high electrical resistance in the order of about $10^4$ to about $10^6$ ohms, whereas the electrical resistance of water-continuous microemulsions can be in the order of about $10^3$ to about $10^4$ ohms. However, due to the percolation phenomenon, an oil-continuous microemulsion can turn into a bicontinuous microemulsion upon progressively increasing the amount of its aqueous phase. Likewise, a water-continuous microemulsion can turn into a bicontinuous microemulsion upon progressively increasing the amount of its oil phase. In other words, a bicontinuous microstructure can be derived through both an oil-continuous and a water-continuous microemulsion, by progressively increasing their respective dispersed phases. There can be, however, a distinguishing feature between a bicontinuous microemulsion derived through an oil-continuous microemulsion and a bicontinuous microemulsion derived through a water-continuous microemulsion. A bicontinuous microemulsion can be converted to a water-continuous microemulsion, when diluted with a sufficient amount of its aqueous phase or water, if the stabilizing surfactant contained therein, along with the overall microemulsion composition, favors the formation of a water-continuous microemulsion. On the other hand, if the stabilizing surfactant contained therein, along with the overall microemulsion composition, favors the formation of an oil-continuous microemulsion, a bicontinuous microemulsion can be converted to an oil-continuous microemulsion, when diluted with a sufficient amount of its oil phase, and it can invert into a water-continuous macroemulsion, when diluted with a sufficient amount of its aqueous phase or water.

Microemulsions are typically classified into four different types: Winsor Types I, II, III, and IV. In Winsor Types I, II, and III microemulsions, a microemulsion phase co-exists in thermodynamic equilibrium with a separated oil phase, a separated aqueous phase, and both a separated oil phase and a separated aqueous phase, respectively. On the other hand, Winsor Type IV microemulsions are free of any separated phase, containing only a microemulsion phase. Applicants have surprisingly discovered that relatively high concentrations of salts of weak-acid, ionic pesticides dissolved in aqueous solutions can be formulated in stable non-water-continuous pesticidal microemulsion compositions without requiring correspondingly high concentrations of stabilizing surfactants. In particular, it has been discovered that high concentrations of salts of weak-acid, ionic pesticides can be effectively formulated in non-water-continuous Winsor Type IV microemulsions when using an oil-soluble or oil-dispersible anionic surfactant as the stabilizing surfactant. Importantly, applicants found that increasing the ionic strength of the aqueous phase (i.e., by increasing the loading of the weak-acid, ionic pesticide salt) permits a reduction in the amount of the anionic stabilizing surfactant. Accordingly, only a small amount of anionic stabilizing surfactant relative to the amount of the aqueous phase is required to provide for a non-water-continuous Winsor Type IV microemulsion that is highly stable (e.g., stable over a wide temperature range about −20° C. to about 55° C.). Thus, the microemulsion compositions of the present invention exhibit a relatively low surfactant demand index (SDI), which is defined as the weight ratio of the stabilizing surfactant to the aqueous phase. Also, the microemulsion compositions can be capable of inverting into a water-continuous, oil-in-water macroemulsion upon sufficient dilution with water.

In accordance with these discoveries, non-water-continuous pesticidal microemulsion compositions of the present invention have an oil-continuous microemulsion-microstructure, either in their existing forms, or when they are diluted with a sufficient volume of their oil phase, generally comprising:

(a) an oil phase comprising a lipophilic component;

(b) an aqueous phase comprising an aqueous solution comprising a salt of a weak-acid, ionic pesticide; and (c) a stabilizing surfactant comprising an oil-soluble or oil-dispersible anionic surfactant, wherein the microemulsion composition has a non-water-continuous microemulsion microstructure. In various embodiments, the microemulsion composition has an oil-continuous microstructure. In other embodiments, the microemulsion composition has a bicontinuous microstructure. In some of these embodiments, when the microemulsion composition has the bicontinuous microstructure and is diluted with additional oil phase, and if necessary additional stabilizing surfactant, then an oil-continuous microstructure can be obtained. For example, in various embodiments, when the bicontinuous microemulsion composition is diluted with additional oil phase in an amount that is about 0.5 to about 1 times (or even more, such as from about 1 times to 4 times) the volume of the microemulsion composition, then an oil-continuous microstructure can be obtained. Additional stabilizing surfactant may also be added to maintain the microemulsion.

Generally, the microemulsion compositions can contain a relatively high pesticide concentration such that in various embodiments the compositions can be considered as pesticidal concentrates. For example, in various embodiments, the microemulsion compositions can have a total pesticide loading of at least about 10 wt. %, at least about 20 wt. %, at least about 30 wt. %, at least about 40 wt. %, at least about 50 wt. %, or at least about 60 wt. %. In some embodiments, the composition has a total pesticide loading of from about 10 wt. % to about 80 wt. %, from about 20 wt. % to about 80 wt. %, from about 30 wt. % to about 80 wt. %, from about 40 wt. % to about 80 wt. %, from about 50 wt. % to about 80 wt. %, from about 60 wt. % to about 80 wt. %, from about 10 wt. % to about 70 wt. %, from about 20 wt. % to about 70 wt. %, from about 30 wt. % to about 70 wt. %, from about 40 wt. % to about 70 wt. %, from about 50 wt. % to about 70 wt. %, from about 60 wt. % to about 70 wt. %, from about 10 wt. % to about 60 wt. %, from about 20 wt. % to about 60 wt. %, from about 30 wt. % to about 60 wt. %, from about 40 wt. % to about 60 wt. %, or from about 50 wt. % to about 60 wt. %. The total pesticide loading includes the total amount of the weak-acid, ionic pesticide, any pesticide in the oil phase, and any other pesticide present. Pesticides concentrations are calculated on an acid equivalent basis when applicable to a weak-acid ionic pesticide.

The microemulsion compositions of the present invention can exhibit relatively low viscosities. Typically, the microemulsion compositions have an apparent viscosity of no greater than about 1,000 cps, no greater than about 900 cps, or no greater than about 800 cps. In various embodiments, the apparent viscosity of the microemulsion composition is from about 50 cps to about 1000 cps, from about 50 cps to about 800 cps, from about 50 cps to about 600 cps, from about 50 cps to about 400 cps, from about 50 cps to about 200 cps, 100 cps to about 1000 cps, from about 100 cps to about 800 cps, from about 100 cps to about 600 cps, from about 100 cps to about 400 cps, or from about 100 cps to about 200 cps where the apparent viscosity is measured using a Brookfield viscometer at a spindle-speed of 100 rpm at 20° C.

Also, the microemulsion composition can be capable of inverting into a water-continuous, oil-in-water macroemulsion upon sufficient dilution with water.

Oil Phase

As noted, the microemulsion compositions of the present invention comprise an oil phase, and have an oil-continuous microemulsion-microstructure, either in their existing forms or when they are diluted with a sufficient volume of their oil phase. In embodiments where microemulsion composition has an oil-continuous microstructure, then the oil phase constitutes a majority of the total volume of the oil-continuous microemulsion composition (excluding any surfactant). In other words, the volume fraction of the oil phase based on the total volume of the composition, excluding the volume of the stabilizing surfactant, is greater than 0.5. In various embodiments, the volume fraction of the oil phase based on the surfactant-free, total volume of the composition is greater than about 0.6, greater than about 0.7, or greater than about 0.8. In some embodiments, the volume fraction of the oil phase based on the total volume of the composition (excluding the volume of the stabilizing surfactant) is from 0.5 to about 0.9, from 0.5 to about 0.8, from 0.5 to about 0.7, from 0.6 to about 0.9, from 0.6 to about 0.8, or from 0.6 to about 0.7. On the other hand, in embodiments where the microemulsion composition has a bicontinuous microstructure, then the volume fraction of the oil phase in the bicontinuous microemulsion composition, based on the total volume of the composition, excluding the volume of the stabilizing surfactant, is typically greater than about 0.2 but less than 0.5, greater than about 0.3 but less than 0.5, greater than about 0.4 but less than about 0.5, greater than about 0.2 but less than 0.45, or greater than about 0.3 but less than 0.45.

In terms of weight, the oil phase can constitute from about 20 wt. % to about 90 wt. %, from about 30 wt. % to about 90 wt. %, from about 40 wt. % to about 90 wt. %, from about 50 wt. % to about 90 wt. %, from about 60 wt. % to about 90 wt. %, from about 70 wt. % to about 90 wt. %, from about 20 wt. % to about 80 wt. %, from about 30 wt. % to about 80 wt. %, from about 40 wt. % to about 80 wt. %, from about 50 wt. % to about 80 wt. %, from about 60 wt. % to about 80 wt. %, from about 70 wt. % to about 80 wt. %, from about 20 wt. % to about 70 wt. %, from about 30 wt. % to about 70 wt. %, from about 40 wt. % to about 70 wt. %, from about 50 wt. % to about 70 wt. %, or from about 60 wt. % to about 70 wt. % of the composition.

The oil phase of the pesticidal microemulsion composition comprises a lipophilic component. The lipophilic component typically constitutes a significant fraction of the oil phase. For example, the lipophilic component can constitute at least about 50 wt. %, at least about 60 wt. %, at least about 70 wt. %, or at least about 80 wt. % of the oil phase. In various embodiments, the lipophilic component constitutes from about 50 wt. % to about 90 wt. %, from about 50 wt. % to about 80 wt. %, from about 50 wt. % to about 70 wt. %, from about 50 wt. % to about 60 wt. %, from about 60 wt. % to about 90 wt. %, from about 60 wt. % to about 80 wt. %, from about 60 wt. % to about 70 wt. %, from about 70 wt. % to about 90 wt. %, from about 70 wt. % to about 80 wt. %, or from about 80 wt. % to about 90 wt. % of the oil phase.

The lipophilic component comprises one or more oil-soluble components. For example, the lipophilic component can be selected from the group consisting of pesticides, organic solvents, fatty esters, fatty alcohols, fatty acids, triglycerides, and mixtures thereof.

In various embodiments, the lipophilic component comprises a pesticide (e.g., an oily and/or oil-dissolvable pesticide). Pesticides include, for example, various herbicides, fungicides, insecticides, nematicides, rodenticides, and so on. When the lipophilic component comprises a pesticide, the solubility of the pesticide in water can be less than about 1 wt. % at 20° C.

One particularly preferred type of pesticides is herbicides. Various classes of herbicides suitable for use as a constituent of the lipophilic component include, for example, acetamides, photosystem II (PS II) inhibitors, protoporphyrinogen oxidase (PPO) inhibitors, acetyl CoA carboxylase (ACCase) inhibitors, and hydroxyphenylpyruvate dioxygenase (HPPD) inhibitors. The lipophilic component can include other herbicides that are oily or oil-dissolvable.

In various embodiments, the lipophilic component comprises an acetamide herbicide. Acetamide herbicides include acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, esters thereof, and mixtures thereof. In some embodiments, the herbicide comprises an acetamide herbicide selected from the group consisting of acetochlor, alachlor, metolachlor, S-metolachlor, and mixtures thereof. In certain embodiments, the herbicide comprises acetochlor.

In some embodiments, the lipophilic component comprises a PS II inhibitor such as ametryn, amicarbazone, atrazine, bentazon, bromacil, bromoxynil, chlorotoluron, cyanazine, desmedipham, desmetryn, dimefuron, diruon, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine, trietazine, esters thereof, and mixtures thereof. In certain embodiments, the lipophilic herbicide comprises metribuzin.

In various embodiments, the lipophilic component comprises a PPO inhibitor. PPO inhibitors include herbicides such as acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil, sulfentrazone, esters thereof, and mixtures thereof.

In these and other embodiments, the lipophilic component comprises an ACCase inhibitor. ACCase inhibitors include, for example, alloxydim, butroxydim, clethodim, cycloxydim, pinoxaden, sethoxydim, tepraloxydim, tralkoxydim, esters thereof, and mixtures thereof. Another group of ACCase inhibitors includes chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop, trifop, esters thereof, and mixtures thereof. ACCase inhibitors also include mixtures of one or more "dims" and one or more "fops", and esters thereof.

In various embodiments, the lipophilic component comprises a HPPD inhibitor. HPPD inhibitors include, for example, mesotrione, sulcotrione, isoxachlortole, isoxaflutole, benzofenap, pyrazolynate, pyrazoxyfen, esters thereof, and mixtures thereof.

When the lipophilic component comprises a pesticide, the pesticide can constitutes at least about 10 wt. %, at least about 20 wt. %, at least about 30 wt. %, at least about 40 wt. %, at least about 50 wt. %, at least about 60 wt. %, at least about 70 wt. %, or at least about 80 wt. % of the oil phase. In various embodiments, the pesticide constitutes from about 10 wt. % to about 90 wt. %, from about 20 wt. % to about 90 wt. %, from about 30 wt. % to about 90 wt. %, from about 40 wt. % to about 90 wt. %, from about 50 wt. % to about 90 wt. %, from about 10 wt. % to about 70 wt. %, from about 20 wt. % to about 70 wt. %, from about 30 wt. % to about 70 wt. %, from about 40 wt. % to about 70 wt. %, from about 50 wt. % to about 70 wt. %, from about 10 wt. % to about 50 wt. %, from about 20 wt. % to about 50 wt. %, from about 30 wt. % to about 50 wt. %, or from about 40 wt. % to about 50 wt. % of the oil phase.

The lipophilic component can comprise an organic solvent. In some embodiments, the lipophilic component consists or consists essentially of an organic solvent. Alternatively, the lipophilic component can comprise a combination of an organic solvent and a pesticide.

Organic solvents include, for example, various hydrocarbon-based solvents such as paraffinic hydrocarbon solvents and aromatic hydrocarbon solvents. Paraffinic hydrocarbon solvents include normal paraffin oil (e.g., NORPAR 15, available from ExxonMobil); isoparaffin oils (e.g., ISOPAR V, ISOPAR L, and ISOPAR M, also available from ExxonMobil); and aliphatic fluids or oils (e.g., EXXSOL D110 and EXXSOL D130, available from ExxonMobil). Aromatic hydrocarbon solvents include, for example, naphthalenic hydrocarbon solvents such as those commonly known as Aromatic 200 (e.g., SOLVESSO 200 commercially available from ExxonMobil). Other organic solvent include halogenated solvents such as chlorobenzene.

As noted, the lipophilic component can also comprise fatty acid esters (e.g., isopropyl myristate), fatty alcohols (oleyl alcohol), fatty acids (e.g., lauric acid), and triglycerides (e.g., vegetable oils).

The lipophilicity of the lipophilic component can be quantified by measuring the octanol-water partition coefficient (Log P) according to methods known in the art. In various embodiments, the lipophilic component has an octanol-water partition coefficient (Log P) of at least about 1 or at least about 1.5 at 25° C. In some embodiments, the lipophilic component has an octanol-water partition coefficient (Log P) of from about 1 to about 10 or from about 1.5 to about 10 at 25° C.

Dielectricity Modifier

In some instances, it may be necessary or desirable to further reduce the surfactant demand (e.g., SDI) of the microemulsion composition. Applicants have discovered that one strategy for further reducing the SDI is by modifying the dielectric constant of the oil phase by adding a dielectricity modifier. Surprisingly, this SDI-reduction effect is exhibited in microemulsion compositions in which the aqueous phase comprises a sufficiently high concentration of the salt of a weak-acid, ionic herbicide. Thus, in various embodiments, the oil phase is dielectricity-modified with a dielectricity modifier.

It has been found that certain oil-miscible, polar organic liquids function as dielectricity modifiers and significantly reduce the SDI value for the microemulsion composition. Generally, the dielectricity modifier has a solubility at 20° C. in the oil phase of at least about 5%, at least about 10%, at least about 20%, at least about 30%, at least about 40%, at least about 50%, at least about 60%, at least about 70%, at least about 80%, at least about 90%, or at least about 95% by weight. In some embodiments, the dielectricity modifier has a solubility at 20° C. in water of no greater than about 20%, no greater than about 15%, no greater than about 10%, no greater than about 5%, no greater than about 2%, no greater than about 1% by weight, no greater than about 1%, or no greater than about 0.5% by weight. In various embodiments, the entire portion or nearly the entire portion (e.g., at least 99 wt. %, at least 97 wt. %, or at least 95 wt. %) of the dielectricity modifier is contained in the dielectricity-modified oil phase. In other embodiments, the aqueous phase also comprises a portion of the dielectricity modifier.

Specific classes of dielectricity modifiers include alkylene glycols (e.g., hexylene glycol), glycol ethers (e.g., ethylene glycol phenyl ether, diethylene glycol butyl ether, and dipropylene glycol butyl ether), branched alcohols (e.g., 2-ethyl 1-hexanol and 2-ethylhexane-1,3-diol), alkylene carbonates (e.g., propylene carbonate), cyclic ketones (e.g., cyclohexanone), and mixtures thereof. For example, the dielectricity modifier can be selected from the group consisting of an alkylene glycol having a dielectric constant of from about 15 to about 26, a glycol ether having a dielectric constant of from about 6.5 to about 11, a branched alcohol having a dielectric constant of from about 7 to about 10, an alkylene carbonate, and mixtures thereof, wherein the dielectric constant is measured at 20° C. In some embodiments, the dielectricity modifier is selected from the group consisting of hexylene glycol, ethylene glycol phenyl ether, diethylene glycol butyl ether, dipropylene glycol butyl ether, 2-ethyl-1-hexanol, 2-ethylhexane-1,3-diol, propylene carbonate, cyclohexanone, and mixtures thereof. In certain embodiments, the dielectricity modifier is a mixture of two or more compounds selected from the group consisting of hexylene glycol, ethylene glycol phenyl ether, diethylene glycol butyl ether, dipropylene glycol butyl ether, 2-ethyl 1-hexanol, 2-ethylhexane-1,3-diol, propylene carbonate, and cyclohexanone.

In various embodiments, the dielectricity modifier has a flash point of at least about 38° C., at least 40° C., or at least about 42° C.

The weight ratio of the dielectricity modifier to the lipophilic component can range from about 2:1 to about 1:20, from about 2:1 to about 1:10, from about 2:1 to about 1:5, from about 1.5:1 to about 1:20, from about 1.5:1 to about 1:10, from about 1.5:1 to about 1:5, from about 1:1 to about 1:20, from about 1:1 to about 1:10, from about 1:1 to about 1:5, from about 1:2 to about 1:20, from about 1:2 to about 1:10, or from about 1:2 to about 1:5.

The lipophilicity of the dielectricity-modified oil phase can also be quantified by measuring the octanol-water partition coefficient (Log P) according to methods known in the art. In various embodiments, the dielectricity-modified oil phase has an octanol-water partition coefficient (Log P) of at least about 1 or at least about 1.5 at 25° C. In some embodiments, the dielectricity-modified oil phase has an octanol-water partition coefficient (Log P) of from about 1 to about 10 or from about 1.5 to about 10 at 25° C.

Aqueous Phase

The microemulsion compositions of the present invention also comprise an aqueous phase. The volume fraction of the aqueous phase based on the total volume of the composition is typically at least about 0.1. In various embodiments, such as when the microemulsion composition has an oil-continuous microstructure, the volume fraction of the aqueous phase can be from about 0.1 to 0.5, from about 0.2 to 0.5, from about 0.3 to 0.5, from about 0.4 to 0.5, from about 0.1 to 0.45, from about 0.2 to 0.45, or from about 0.3 to 0.45. In other embodiments, such as when the microemulsion composition has a bicontinuous microstructure, the volume fraction of the aqueous phase can be 0.5 or greater, 0.55 or greater, or 0.6 or greater. For example, the volume fraction of the aqueous phase can be from about 0.5 to about 0.7, from about 0.5 to about 0.6, from about 0.5 to about 0.55, from about 0.55 to about 0.7, or from about 0.55 to 0.6. On a weight basis, the aqueous phase typically constitutes from about 5 wt. % to about 75 wt. %, from about 10 wt. % to about 75 wt. %, from about 20 wt. % to about 75 wt. %, from about 30 wt. % to about 75 wt. %, from about 5 wt. % to about 70 wt. %, from about 10 wt. % to about 70 wt. %, from about 20 wt. % to about 70 wt. %, from about 30 wt. % to about 70 wt. %, from about 5 wt. % to about 65 wt. %, from about 10 wt. % to about 65 wt. %, from about 20 wt. % to about 65 wt. %, from about 30 wt. % to about 65 wt. %, from about 5 wt. % to about 60 wt. %, from about 10 wt. % to about 60 wt. %, from about 20 wt. % to about 60 wt. %, from about 30 wt. % to about 60 wt. %, from about 5 wt. % to about 50 wt. %, from about 10 wt. % to about 50 wt. %, from about 20 wt. % to about 50 wt. %, from about 30 wt. % to about 50 wt. %, from about 10 wt. % to about 40 wt. %, from about 20 wt. % to about 40 wt. %, or from about 30 wt. % to about 40 wt. % of the composition.

According to the present invention, the aqueous phase comprises an aqueous solution comprising a salt of a weak-acid, ionic pesticide. In various embodiments, the concentration of the salt of the weak-acid, ionic pesticide on an acid equivalent basis in the aqueous phase is from about 5 wt. % to about 65 wt. %, from about 10 wt. % to about 65 wt. %, from about 20 wt. %, to about 65 wt. %, from about 30 wt. % to about 65 wt. %, from about 5 wt. % to about 60 wt. %, from about 10 wt. % to about 60 wt. %, from about 20 wt. % to about 60 wt. %, from about 30 wt. % to about 60 wt. %, from about 5 wt. % to about 50 wt. %, from about 10 wt. % to about 50 wt. %, from about 20 wt. % to about 50 wt. %, from about 30 wt. % to about 50 wt. %, from about 5 wt. % to about 40 wt. %, or from about 5 wt. % to about 20 wt. %.

Salts of the weak-acid, ionic pesticides generally include agriculturally acceptable salts such as alkali metal, alkaline earth metal, and amine salts. In various embodiments, the salt of the weak-acid, ionic pesticide comprises an alkali metal salt (e.g., sodium and potassium pesticide salts). In these and other embodiments the salt of a weak-acid, ionic pesticide comprises an amine salt (e.g., ammonium, monoethanolamine, diethanolamine, triethanolamine, dimethylamine, diglycolamine, isopropylamine etc.).

In various embodiments, the salt of the weak-acid, ionic pesticide comprises a salt of a weak-acid, ionic herbicide. Classes of herbicides that include salts of weak-acid, ionic herbicides include auxin herbicides, ACCase inhibitors, acetolactate synthase (ALS) or acetohydroxy acid synthase (AHAS) inhibitors, PPO inhibitors, auxin transport inhibitors, and other herbicides.

In various embodiments, the salt of the weak-acid, ionic herbicide comprises a salt of an auxin herbicide. Auxin herbicides include 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; and mixtures thereof. In some embodiments, the auxin herbicide comprises 2,4-D. In these and other embodiments, the auxin herbicide comprises dicamba. For example, specific salts of dicamba include sodium dicamba, potassium dicamba, diglycolamine dicamba, monoethanolamine dicamba, diethanolamine dicamba, triethanolamine dicamba, dimethylamine dicamba, and mixtures thereof. In some embodiments, the salt of the auxin herbicide is selected from the group consisting of sodium dicamba, diglycolamine dicamba, and monoethanolamine dicamba, and mixtures thereof.

Other agronomically acceptable salts of auxin herbicides include polyamine salts such as those described in U.S. Patent Application Publication No. 2012/0184434, which is incorporated herein by reference. The polyamines described in U.S. 2012/0184434 include those of formula (A)

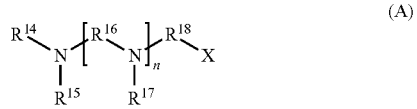

(A)

wherein $R^{14}$, $R^{15}$, $R^{17}$, $R^{19}$ and $R^{20}$ are independently H or $C_1$-$C_6$-alkyl, which is optionally substituted with OH, $R^{16}$ and $R^{18}$ are independently $C_2$-$C_4$-alkylene, X is OH or $NR^{19}R^{20}$, and n is from 1 to 20; and those of formula (B)

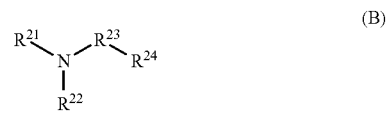

(B)

wherein $R^{21}$ and $R^{22}$ are independently H or $C_1$-$C_6$-alkyl, $R^{23}$ is $C_1$-$C_{12}$-alkylene, and $R^{24}$ is an aliphatic $C_5$-$C_8$ ring system, which comprises either nitrogen in the ring or which is substituted with at least one unit $NR^{21}R^{22}$. Specific examples of these polyamines include tetraethylenepentamine, triethylenetetramine, diethylenetriamine, pentamethyldiethylenetriamine, N,N,N',N'',N''-pentamethyl-dipropylentriamine, N,N-bis(3-dimethylaminopropyl)-N-isopropanolamine, N'-(3-(dimethylamino)propyl)-N,N-dimethyl-1,3-propanediamine, N,N-bis(3-aminopropyl)methylamine, N-(3-dimethylaminopropyl)-N,N-diisopropanolamine, N,N,N'-trimethylaminoethyl-ethanolamine, aminopropylmonomethylethanolamine, and aminoethylethanolamine, and mixtures thereof.

In some embodiments, the salt of the weak acid, ionic herbicide comprises a salt of an ACCase inhibitor. Weak-acid, ionic ACCase inhibitors include clodinafop-propargyl, cyhalofop, diclofop, fenoxaprop-P, fluazifop-P, haloxyfop, quizalofop-P, and mixtures thereof.

In further embodiments, the salt of the weak-acid, ionic herbicide comprises a salt of an acetolactate synthase (ALS) or acetohydroxy acid synthase (AHAS) inhibitor. Weak-acid, ionic ALS or AHAS inhibitors include bispyribac-sodium, flucarbazone-sodium, flupyrsulfuron-methyl-sodium, imazamethabenz, imazamox, imazapic, imazapyr, imazaquin, imazethapyr, imazosulfuron, iodosulfuron, propoxycarbazone-sodium, pyrithiobac-sodium, and mixtures thereof.

In various embodiments, the salt of the weak-acid, ionic herbicide comprises a salt of a PPO inhibitor. Weak-acid, ionic PPO inhibitors include acifluorfen, flumiclorac, fomesafen, and mixtures thereof.

In some embodiments, the salt of the weak-acid, ionic herbicide comprises a salt of an auxin transport inhibitors. Weak-acid, ionic auxin transport inhibitors include diflufenzopyr, naptalam, and mixtures thereof.

In still further embodiments, the salt of the weak-acid, ionic herbicide comprises a salt of benazolin, endothall, maleic hydrazide, and mixtures thereof.

One group of preferred salts of weak-acid, ionic herbicides comprises a salt of dicamba, a salt of 2,4-D, a salt of fomesafen, and mixtures thereof.

As explained, it has been found that increasing the ionic strength of the aqueous phase (i.e., by increasing the loading of the weak-acid, ionic pesticide salt) permits a reduction in the amount of the anionic stabilizing surfactant. Thus, in various embodiments, the ionic strength of the aqueous solution of the aqueous phase is from about 0.5 mol/L to about 3.5 mol/L, from about 1 mol/L to about 3.4 mol/L, or from about 1.5 mol/L to about 3.3 mol/L.

Stabilizing Surfactant

The microemulsion compositions of the present invention further comprise a stabilizing surfactant comprising an oil-soluble or oil-dispersible anionic surfactant. Thus, the stabilizing surfactant can generally be considered as a sub-phase of the oil phase. Typically, the stabilizing surfactant constitutes no more than about 20 wt. %, no more than about 15 wt. %, or no more than about 10 wt. % of the composition. In various embodiments, the stabilizing surfactant constitutes from about 1 wt. % to about 20 wt. %, from about 1 wt. % to about 15 wt. %, from about 1 wt. % to about 10 wt. %, from about 2.5 wt. % to about 20 wt. %, from about 2.5 wt. % to about 15 wt. %, from about 2.5 wt. % to about 10 wt. %, from about 5 wt. % to about 20 wt. %, from about 5 wt. % to about 15 wt. %, from about 5 wt. % to about 10 wt. %, from about 10 wt. % to about 20 wt. %, or from about 10 wt. % to about 15 wt. % of the composition.

Also, the amount of stabilizing surfactant can be quantified with respect to the amount of the aqueous phase. For example, in various embodiments, the weight ratio of stabilizing surfactant to aqueous phase (i.e., SDI as referred to herein) is no greater than about 0.8:1, no greater than about 0.7:1, no greater than about 0.65:1, no greater than about 0.6:1, or no greater than about 0.5:1. In some embodiments, the weight ratio of the stabilizing surfactant to the aqueous phase is from about 0.2:1 to about 0.65:1, from about 0.3:1 to about 0.6:1, or from about 0.3:1 to about 0.5:1.

Various types of oil-soluble or oil-dispersible, anionic surfactants can be effective as a stabilizing surfactant for providing non-water-continuous pesticidal microemulsion compositions which necessarily have relatively low SDI values, and can remain stable as Winsor Type IV microemulsions even upon heating and freeze-thawing, while capable of inverting readily into oil-in-water macroemulsions upon dilution with water. Classes of these anionic surfactants include both mono- and dialkyl-chain surfactants, diaryl surfactants, and mixtures thereof as well as both alkoxylated and non-alkoxylated surfactants such as alkoxylated alkyl and/or aryl phosphate esters, alkyl ether carboxylates, alkoxylated alkylphenol sulfonates, neutralized fatty acids, dialkyl sulfosuccinates, and mixtures thereof. Specific examples of stabilizing surfactants are alkoxylated alkyl and/or aryl phosphate esters such as MAPHOS 60A (BASF), STEPFAC 8182 (Stepan), STEPFAC 8181 (Stepan), PHOSPHOLAN PS 131 (AkzoNobel), and SURFOM 1323 SC (Oxiteno); alkyl ether carboxylates such as the AKYPO series of surfactants from Kao Chemicals; alkyl, aryl, and alkyl-aryl ether sulfates such as ethoxylated tallowamine salt of nonylphenol ether sulfate from Stepan Company; sodium dioctyl (ethylhexyl) sulfosuccinate; sodium dihexyl sulfosuccinate; sodium bis(tridecyl) sulfosuccinate; sodium dicyclohexyl sulfosuccinate; and mixtures thereof.

In various embodiments, the anionic surfactant is selected from the group consisting of a dialkyl surfactant, diaryl surfactant, alkoxylated alkyl and/or aryl phosphate esters, alkyl ether carboxylates, alkoxylated alkylphenol sulfonates, neutralized fatty acids, dialkyl sulfosuccinates, and mixtures thereof. In these and other embodiments, the anionic surfactant is selected from the group consisting of an alkyl ether phosphate, an aryl ether phosphate, an alkyl-aryl ether phosphate, an alkyl ether carboxylate, an aryl ether carboxylate, an alkyl-aryl ether carboxylate, alkyl-aryl ether sulfonates, and mixtures thereof. In certain embodiments, the anionic surfactant comprises an alkoxylated alkyl phosphate ester.

In various embodiments, the anionic surfactant is alkoxylated and comprises no more than an average of about 20 $C_1$-$C_4$ alkylene oxide groups, no more than an average of about 16 $C_1$-$C_4$ alkylene oxide groups, or no more than an average of about 10 $C_1$-$C_4$ alkylene oxide groups. In various embodiments, the anionic surfactant is ethoxylated and comprises no more than an average of about 20 ethylene oxide groups, no more than an average of about 16 ethylene oxide groups, or no more than an average of about 10 $C_1$-$C_4$ ethylene oxide groups. In some embodiments, the anionic surfactant comprises on an average of from about 5 to about 20 ethylene oxide groups, from about 8 to about 16 ethylene oxide groups, or from about 10 to about 12 ethylene oxide groups. By utilizing an anionic surfactant having a higher ethylene oxide content (e.g., ethoxylated phosphate esters) it may be possible to reduce or eliminate any need for an auxiliary surfactant (described below) in the microemulsion composition. In certain embodiments, the anionic surfactant is selected from the group consisting of ethoxylated phosphate ester and/or ethoxylated carboxylate surfactants.

The stabilizing surfactant should be capable of forming reverse micelles in the microemulsion compositions, for example, by virtue of having a Critical Packing Parameter (CPP) of greater than 1, wherein the CPP is defined as being the ratio of molar volume of the hydrophobic portion (tail portion) of the surfactant to the product of the surfactant head group area and the length of the surfactant tail.

In formulating the microemulsion compositions, the stabilizing surfactants can be added as solutions, for example, in a hydrocarbon-based solvent (e.g., ISOPAR M), a fatty acid ester solvent (e.g., isopropyl myristate), or an alcohol solvent mixture.

Auxiliary Surfactants

The microemulsion compositions of the present invention can further comprise an auxiliary surfactant. An auxiliary surfactant can be added to the microemulsion compositions, for example, to enhance efficacy of the pesticide(s), enhance inversion of the microemulsion compositions to water-continuous oil-in-water macroemulsions upon sufficient dilution, and increase weak flocculation of the oil droplets in the prepared oil-in-water macroemulsions.

The weight ratio of the auxiliary surfactant to the stabilizing surfactant is typically less than about 0.5:1, less than about 0.3:1, or less than about 0.15:1. For example, the weight ratio of auxiliary surfactant to stabilizing surfactant can range from about 0.01:1 to about 0.5:1, from about 0.05:1 to about 0.5:1, from about 0.1:1 to about 0.5:1, from about 0.01:1 to about 0.3:1, from about 0.05:1 to about 0.3:1, from about 0.1:1 to about 0.3:1, from about 0.01:1 to about 0.15:1, from about 0.05:1 to about 0.15:1, or from about 0.1:1 to about 0.15:1. In various embodiments, the total amount of the stabilizing surfactant(s) and auxiliary surfactant(s) in the composition is from about 1 wt. % to about 20 wt. %, from about 4 wt. % to about 18 wt. %, or from about 7 wt. % to about 15 wt. %.

Preferably, the non-water-continuous, pesticidal microemulsion compositions can invert to water-continuous, oil-in-water macroemulsions upon substantial dilution with water, without high-shear mixing. Auxiliary surfactants useful for enhancing inversion of the microemulsion composition upon dilution include oil-soluble or oil-dispersible block copolymer surfactants, including an A-B-A type of an amphiphilic, block copolymer surfactant, wherein “A” represents a hydrophobic, polymeric alkyl chain such as polypropylene oxide (PPO), and “B” represents a hydrophilic polymer chain such as polyethylene oxide (PEO), or vice versa. Examples of useful block copolymer surfactants are polyethylene glycol (30) dipolyhydroxystearate, polyglycerin (2) dipolyhydroxystearate, PEO-PPO-PEO block copolymers, and mixtures thereof.

The auxiliary surfactant can also include a cationic surfactant. Cationic surfactants can effectively reduce the anionic surface charge (due to the anionic surfactant used as the stabilizing surfactant for the non-water-continuous microemulsion compositions) of the pesticide oil droplets in oil-in-water macroemulsions, which are produced when the pesticidal microemulsion compositions are diluted with water for use as pesticidal spray emulsions. A reduction in the anionic surface charge could possibly lead to weak flocculation of the oil droplets, as well as minimize the electrostatic repulsion between the oil droplets and the anionic surface of soil (since soil surface is anionic) following pesticide (e.g., herbicide) application onto the soil. Both these effects could possibly enable a greater retention of the pesticide oil droplets in the top layers of soil against rain or irrigation. Weak-flocculation refers flocculated oil droplets that can break up easily (i.e., disengage from flocculation a phenomenon commonly referred to in colloid literature as repeptization of flocs) even under slight agitation or shear, releasing the individual droplets. This means that the oil-in-water macroemulsions are not overly flocculated when under agitation, but can be heavily flocculated when under no agitation. Examples of suitable cationic auxiliary surfactants include quaternary ammonium salt surfactants such as ARQUAD T-50 and ARQUAD 2C-75, which are available from AkzoNobel.

The microemulsion composition may optionally be formulated with additional ingredients such as pH adjusting agents or pH buffers, antifreeze agents, drift control agents, and safeners as needed. To maintain a substantial level of chemical stability of the pesticide(s) in a given composition, additional ingredients, such as pH adjusting agents, stabilizing agents (e.g., antioxidants), UV light-absorbers, photostabilizers, chelating agents, may be added. For example, certain microemulsion composition comprising a pesticide such as an acetamide herbicide (e.g., acetochlor) may benefit from the addition of acid to lower the pH of the composition to provide enhanced chemical stability of the herbicide.

Further, when the lipophilic component comprises an herbicide such as an acetamide herbicide, then the microemulsion can further comprise a safener. Suitable safeners include, for example, furilazole ((RS)-3-(dichloroacetyl)-5-(2-furanyl)-2,2-dimethyl-1,3-oxazolidine 95%), commercially available from Monsanto Company; AD 67 (4-(dichloroacetyl)-1-oxa-4-azaspiro[4,5]decane); benoxacor (CGA 154281, (RS)-4-dichloroacetyl-3,4-dihydro-3-methyl-2H-1,4-benzoxazine); cloquintocet-mexyl (CGA 184927, (5-chloroquinolin-8-yloxy)acetic acid); cyometrinil (CGA 43089, (Z)-cyanomethoxyimino(phenyl) acetonitrile); cyprosulfamide (N-[4-(cyclopropylcarbamoyl)phenylsulfonyl]-o-anisamide); dichlormid (DDCA, R25788, N,N-diallyl-2,2-dichloroacetamide); dicyclonon ((RS)-1-dichloroacetyl-3,3,8a-trimethylperhydropyrrolo[1,2-a]pyrimidin-6-one); dietholate (O,O-diethyl O-phenyl phosphorothioate) fenchlorazole-ethyl (HOE 70542, 1-(2,4-dichlorophenyl)-5-trichloromethyl-1H-1,2,4-triazole-3-carboxylic acid); fenclorim (CGA 123407 4,6-dichloro-2-phenylpyrimidine); flurazole (benzyl 2-chloro-4-trifluoromethyl-1,3-thiazole-5-carboxylate); fluxofenim (CGA 133205, 4'-chloro-2,2,2-trifluoroacetophenone (EZ-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil (CGA 92194, (Z)-1,3-dioxolan-2-ylmethoxyimino(phenyl)acetonitrile); and others as are known in the art.

Herbicidal Compositions Containing an Auxin Herbicide

The present invention also relates to herbicidal concentrate compositions having a high loading of an auxin herbicide. It has been discovered that herbicidal concentrate compositions having an auxin herbicide concentration of at least about 40 wt. % or at least about 45 wt. % on an acid equivalent basis can be prepared by incorporating an alkylene glycol, particularly an alkylene glycol in which the auxin herbicide is highly soluble in (e.g., at least 30 wt. % or more) and which is soluble in water. Accordingly, in various embodiments, the herbicidal concentrate compositions comprise an auxin herbicide component comprising an anion of an auxin herbicide and a salt-forming cation; water; and an alkylene glycol, wherein the concentration of the auxin herbicide on an acid equivalent basis is at least about 40 wt. % or at least about 45 wt. %. In some embodiments, the concentration of the auxin herbicide on an acid equivalent basis can be from about 40 wt. % to about 55 wt. %, from about 40 wt. % to about 55 wt. %, from about 45 wt. % to about 55 wt. %, or from about 45 wt. % to about 45 wt. %.

The auxin herbicide can comprise one or more of those described herein. For example, the auxin herbicide can be selected from the group consisting of dicamba; 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; and mixtures thereof. In some embodiments, the auxin herbicide comprises dicamba. In certain embodiments, the auxin herbicide comprises 2,4-D.

The salt-forming cation can also comprise one or more of those described herein for the weak acid, ionic pesticide. For example, the salt-forming cation can comprise a cation of an amine, an alkali metal, or mixture thereof. In various embodiments, the salt-forming cation comprises a cation of an amine selected from the group consisting of ammonia, monoethanolamine, diethanolamine, triethanolamine, dimethylamine, diglycolamine, isopropylamine, and mixtures thereof. In these and other embodiments, the salt-forming cation comprises a cation of an alkali metal selected from the group consisting of sodium, potassium, and mixtures thereof.

Typically, the auxin herbicide in these concentrate compositions is not fully neutralized, but only partially neutralized with base. For example, the molar ratio of salt-forming cation to auxin herbicide anion is usually no greater than about 0.8:1, no greater than about 0.75:1, no greater than about 0.7:1, no greater than about 0.65:1, or no greater than about 0.6:1. In some embodiments, the molar ratio of salt-forming cation to auxin herbicide anion is no greater than about 0.55:1, no greater than about 0.5:1; no greater than about 0.45:1, no greater than about 0.4:1, no greater than about 0.35:1, no greater than about 0.3:1, no greater than about 0.25:1, or no greater than about 0.2:1. In various embodiments, the molar ratio of salt-forming cation to auxin herbicide anion is from about 0.2:1 to about 0.8:1, from about 0.2:1 to about 0.75:1, from about 0.2:1 to about 0.7:1, from about 0.2:1 to about 0.65:1, from about 0.2:1 to about 0.6:1, from about 0.2:1 to about 0.55:1, from about 0.2:1 to about 0.5:1, from about 0.2:1 to about 0.45:1, from about 0.2:1 to about 0.4:1, from about 0.2:1 to about 0.35:1, from about 0.2:1 to about 0.3:1, from about 0.3:1 to about 0.8:1, from about 0.3:1 to about 0.75:1, from about 0.3:1 to about 0.7:1, from about 0.3:1 to about 0.65:1, from about 0.3:1 to about 0.6:1, from about 0.3:1 to about 0.55:1, from about 0.3:1 to about 0.5:1, from about 0.3:1 to about 0.45:1, from about 0.3:1 to about 0.4:1, from about 0.4:1 to about 0.8:1, from about 0.4:1 to about 0.75:1, from about 0.4:1 to about 0.7:1, from about 0.4:1 to about 0.65:1, from about 0.4:1 to about 0.6:1, from about 0.4:1 to about 0.55:1, from about 0.4:1 to about 0.5:1, from about 0.5:1 to about 0.9:1, from about 0.5:1 to about 0.8:1, from about 0.5:1 to about 0.75:1, from about 0.5:1 to about 0.7:1, from about 0.5:1 to about 0.65:1, from about 0.6:1 to about 0.9:1, from about 0.6:1 to about 0.8:1, from about 0.6:1 to about 0.75:1, from about 0.6:1 to about 0.7:1, or from about 0.6:1 to about 0.65:1.

As noted, alkylene glycols particularly suited for preparing these herbicidal concentrate compositions are water miscible or highly water soluble and are compatible with the auxin herbicide in that the auxin herbicide is highly soluble (e.g., at least 30 wt. % or more) in the alkylene glycol. Examples of these alkylene glycols generally including branched or straight chain $C_2$ to $C_{10}$ glycols, particularly $C_2$ to $C_6$ glycols. In some embodiments, the alkylene glycol is selected from the group consisting of propylene glycol; hexylene glycol; 1,3-propanediol; 1,4-butanediol; 1,3-butanediol; and mixtures thereof.

Moreover, the alkylene glycol concentration is typically at least about 5 wt. %, at least about 10 wt. %, at least about 15 wt. %, at least about 20 wt. %, at least about 25 wt. %, or at least about 30 wt. %. In various embodiments, the alkylene glycol concentration in the herbicidal concentrate composition is from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 40 wt. %, from about 15 wt. % to about 35 wt. %, from about 15 wt. % to about 30 wt. %, from about 20 wt. % to about 40 wt. %, from about 20 wt. % to about 35 wt. %, or from about 20 wt. % to about 30 wt. %.

As noted, the herbicidal concentrate composition contains water along with an alkylene glycol as the solvent. Water is present to provide sufficient ionic dissociation so that the ionic strength of the composition is favorable for achieving a relatively low surfactant demand index (SDI). As compared to water, the alkylene glycol has a low dielectric constant and can suppress ionic dissociation. Thus, addition of water increases the dielectric constant and hence ionic dissociation in the composition. Typically, water is added to the herbicidal concentrate composition to provide a concentration of water, excluding any water produced by the neutralization of the weak-acid herbicide with hydroxide bases, that is from about 5 wt. % to about 25 wt. %, from about 5 wt. % to about 20 wt. %, from about 5 wt. % to about 15 wt. %, from about 10 wt. % to about 25 wt. %, from about 10 wt. % to about 20 wt. %, from about 10 wt. % to about 15 wt. %, from about 12 wt. % to about 25 wt. %, or from about 12 wt. % to about 20 wt. %. In various embodiments, sufficient water is added to provide for a weight ratio of alkylene glycol to water is from about 1:1 to about 5:1, from about 2:1 to about 5:1, from about 3:1 to about 5:1, from about 1:1 to about 4:1, from about 2:1 to about 4:1, or from about 3:1 to about 4:1.

The herbicidal concentrate composition can also further comprise a co-herbicide. Co-herbicides generally include water-soluble herbicides such as those formulated as salts to enhance water-solubility. For example, suitable water-soluble herbicides include water-soluble salts of weak-acid, ionic herbicides as described herein such as various ACCase inhibitors, acetolactate synthase (ALS) or acetohydroxy acid synthase (AHAS) inhibitors, PPO inhibitors, auxin transport inhibitors, and other herbicides.

The herbicidal concentrate compositions can be prepared by mixing an auxin herbicide acid, a base, water, and an alkylene glycol to form the herbicidal concentrate composition. The base used for neutralization can be the bases corresponding to the salt-forming cations as mentioned herein.

As described further herein, the herbicidal concentrate compositions can be used for, among other things, in forming the aqueous phase of the non-water-continuous herbicidal microemulsion compositions.

The present invention is also directed to a herbicidal composition comprising an auxin herbicide acid and an alkylene glycol. The auxin herbicide acid can be the acid form of any of the auxin herbicides described herein (e.g., dicamba acid). Also, the alkylene glycol can be any of the glycols described herein (e.g., a $C_2$ to $C_{10}$ glycol). It has been discovered that dicamba acid can complex with alkylene glycols. In some cases, these complexes have been found to be partially or fully miscible in an organic solvent.

The concentration of the auxin herbicide acid can be at least about 5 wt. %, at least about 10 wt. %, at least about 15 wt. %, at least about 20 wt. %, at least about 25 wt. %, or at least about 30 wt. %. For example, the concentration of the auxin herbicide acid can be from about 5 wt. % to about 50 wt. %, from about 5 wt. % to about 40 wt. %, from about 5 wt. % to about 30 wt. %, from about 5 wt. % to about 20 wt. %, from about 5 wt. % to about 15 wt. %, from about 10 wt. % to about 50 wt. %, from about 10 wt. % to about 40 wt. %, from about 10 wt. % to about 30 wt. %, from about 10 wt. % to about 20 wt. %, or from about 10 wt. % to about 15 wt. %.

Typically, the molar ratio of alkylene glycol to auxin herbicide is at least about 1:1, at least about 1.5:1, at least about 2:1, at least about 2.5:1, at least about 3:1, at least about 3.5:1, or at least about 4:1. For example, the molar ratio of alkylene glycol to auxin herbicide can be from about 1:1 to about 10:1, from about 2:1 to about 10:1, from about 3:1 to about 10:1, from about 4:1 to about 10:1, from about 1:1 to about 7.5:1, from about 2:1 to about 7.5:1, from about 3:1 to about 7.5:1, from about 4:1 to about 7.5:1, from about 1:1 to about 5:1, from about 2:1 to about 5:1, from about 3:1 to about 5:1, or from about 4:1 to about 5:1.

These herbicidal compositions can further comprise an acetamide herbicide including any of those describe herein (e.g., acetochlor). The concentration of the acetamide herbicide can be at least about 10 wt. %, at least about 15 wt. %, at least about 20 wt. %, at least about 25 wt. %, at least about 30 wt. %, at least about 35 wt. %, or at least about 40 wt. %. For example, the concentration of the acetamide herbicide can be from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

As described further herein, these herbicidal compositions can be used for, among other things, in forming the aqueous phase of the non-water-continuous herbicidal microemulsion compositions.

The compositions described above can include one or more other features in combination as described herein.

Methods for Preparing the Non-Water-Continuous Pesticidal Microemulsion Compositions The present invention also includes methods for preparing the non-water-continuous, pesticidal microemulsion compositions described herein. Various methods include mixing an oil phase comprising the lipophilic component with the stabilizing surfactant comprising the oil-soluble or oil-dispersible anionic surfactant to form an oil phase mixture; and mixing the aqueous solution comprising the salt of the weak-acid, ionic pesticide into the oil phase mixture to form the non-water-continuous pesticidal microemulsion composition. Mixing is typically conducted under sufficient agitation until the composition appears uniform and optically transparent.

Another method of preparing the non-water-continuous herbicidal microemulsion compositions comprises mixing an oil phase comprising the lipophilic component with the stabilizing surfactant comprising the oil-soluble or oil-dispersible anionic surfactant to form an oil phase mixture; mixing an auxin herbicide acid, a base, water, and an alkylene glycol to form a herbicidal concentrate composition (as described herein); and mixing the herbicidal concentrate composition or dilution thereof into the oil phase mixture to form the non-water-continuous herbicidal microemulsion composition.

The stabilizing surfactant can be dissolved in a suitable lipophilic, oily liquid such a hydrocarbon-based solvent (e.g., ISOPAR M) prior to mixing with the oil phase. Also, additional ingredients, such as the dielectricity modifier, pH-adjustment agents, safener, and deionized water, if needed, can be mixed into the microemulsion compositions. Auxiliary surfactants can be added to the oil-continuous phase before or after the addition of the aqueous phase components.

Preparation of Water-Continuous Pesticidal Macroemulsions

The present invention also includes methods for preparing pesticidal application mixtures. Generally, the method comprises mixing water with a non-water-continuous pesticidal microemulsion composition as described herein to form a pesticidal application mixture, wherein the pesticidal application mixture is an oil-in-water macroemulsion. That is, upon sufficient dilution with water, the microemulsion composition inverts into a water-continuous macroemulsion. For example, the microemulsion composition can be diluted with about 5 to about 75 or from about 10 to about 50 times its weight with water.

Typically, the pesticide loading in the application mixture is no more than about 5% by weight or is from about 0.1% to about 5% by weight, such as 5%, 4%, 3%, 2%, 1%, 0.5% or 0.1% by weight on an acid equivalent basis, when applicable. Also, in various embodiments, the pesticidal application mixture has a particle size distribution of the oil-in-water droplets that is characterized by about 90% by volume of the droplets having a size in the range of from about 0.1 microns to about 1000 microns, from about 0.1 microns to about 500 microns, from about 0.1 microns to about 200 microns, from about 0.25 microns to about 1000 microns, from about 0.25 microns to about 500 microns, from about 0.25 microns to about 200 microns, from about 0.5 microns to about 1000 microns, from about 0.5 microns to about 500 microns, from about 0.5 microns to about 200 microns, from about 1 micron to about 100 microns, or from about 2 microns to about 50 microns.

Stabilization of Herbicidal Compositions

It has been discovered that in certain circumstances herbicidal active ingredients can react with each other such that an herbicidal mixture containing a mixture of the actives will exhibit a progressive decomposition or degradation of the two actives. In particular, applicants have discovered that acetamide herbicides such as acetochlor can react with auxin herbicides such as dicamba under certain conditions. Over prolonged storage conditions, herbicidal compositions containing a mixture of these herbicides may exhibit a decrease in concentration of the herbicides due to these reactions. Applicants have surprisingly discovered a series of effective strategies to chemically stabilize these compositions to reduce or eliminate progressive loss of the herbicide actives (e.g., via decomposition or degradation reactions). Accordingly, the present invention is also directed to various herbicidal compositions having improved chemical stability and as well as methods of preparing these compositions, which employ one or more of the strategies discovered by applicants.

The strategies discovered by applicants can be used to stabilize the microemulsion compositions described herein as well as other herbicidal compositions that include an oil phase comprising an acetamide herbicide; and an aqueous phase comprising an aqueous solution comprising an auxin herbicide component. In various embodiments, the herbicidal compositions comprises an oil phase comprising an acetamide herbicide; and an aqueous phase comprising an aqueous solution comprising an auxin herbicide component comprising an anion of an auxin herbicide and a salt-forming cation. Generally, the compositions further include one or more of the features described below to employ at least one of the strategies for improving chemical stability.

Chemical stability is evaluated by determining the weight % recovery of the acetamide herbicide and/or auxin herbicide after storage for a period of time at a fixed temperature. In one stability test, the composition is stored at 40° C. for 8 weeks. In another stability test, the composition is stored at 54° C. for 8 weeks. The herbicide concentrations are measured at the beginning of the storage period and at the end of the storage period. The weight % recovery of the acetamide herbicide and/or auxin herbicide is calculated by dividing the final concentration (e.g., weight % after storage period) of the acetamide herbicide and/or auxin herbicide by the initial concentration (e.g., weight % at start of storage period) of the respective herbicide and multiplying by 100%. The greater the weight % recovery of the herbicide, the greater the chemical stability of the composition.

One strategy for improving chemical stability discovered by applicants includes decreasing the pH of the composition, for example, by the addition of an acidic pH adjusting agent. Acidic pH adjusting agents include, for example, strong acids such as hydrochloric acid, sulfuric acid, nitric, acid, and phosphoric acid. Weak acids can also be used as acidic pH adjusting agents. Weak acids include various carboxylic acids (e.g., monocarboxylic acids) including, for example, formic acid, acetic acid, lactic acid, and glycolic acid. Using this strategy, the pH of the composition is typically no greater than about 6, no greater than about 5.5, no greater than about 5, or no greater than 4.5. In various embodiments, the pH is from about 3 to about 6, from about 3.5 to about 6, from about 4 to about 6, from about 4.5 to about 6, from about 5 to about 6, from about 3 to about 5.5, from about 3.5 to about 5.5, from about 4 to about 5.5, from about 4.5 to about 5.5, from about 5 to about 5.5, from about 3 to about 5, from about 3.5 to about 5, from about 4 to about 5, from about 4.5 to about 5, from about 3 to about 4.5, from about 3.5 to about 4.5, or from about 3.5 to about 4. To measure the pH of the composition, the pH-probe of a suitably calibrated pH-meter is inserted into a sample of the composition, and the pH is recorded after an elapsed time of 6 minutes. Typically, in the case of non-water-continuous microemulsion compositions, the pH is from about 1 to about 2 pH-units higher than the pH of a water-continuous emulsion that is obtained after diluting the non-water-continuous microemulsion with deionized water by a factor of from about 5 to about 10 times the weight of the microemulsion.

Accordingly, similar to the abovementioned strategy, another strategy for improving chemical stability is lowering the pH of the composition such that a 1 wt. % auxin herbicide acid equivalent dilution of the composition has a pH that is no greater than about 4, no greater than about 3.75, or no greater than about 3.5. In various embodiments, the pH of the composition is such that a 1 wt. % auxin herbicide acid equivalent dilution of the composition has a pH from about 2 to about 4, from about 2.5 to about 4, from about 3 to about 4, from about 2 to about 3.75, from about 2.5 to about 3.75, from about 3 to about 3.75, from about 2 to about 3.5, from about 2.5 to about 3.5, or from about 3 to about 3.5. Suitable acids for decreasing the pH of the herbicidal compositions described herein (e.g., herbicidal microemulsions and the herbicidal mixtures obtained upon dilution with water) include, for example, strong acid such as HCl, $H_2SO_4$, and/or $HNO_3$.

Still another strategy for improving chemical stability is using an auxin herbicide that is only partially neutralized during preparation of the composition (i.e., a mixture of auxin herbicide acid and salt). Under this strategy, the molar ratio of the salt-forming cation to the anion of the auxin herbicide is generally less than 1:1, but more particularly, is no greater than about 0.8:1, no greater than about 0.75:1, no greater than about 0.7:1, no greater than about 0.65:1, no greater than about 0.6:1, no greater than about 0.55:1, no greater than about 0.5:1; no greater than about 0.45:1, no greater than about 0.4:1, no greater than about 0.35:1, no greater than about 0.3:1, no greater than about 0.25:1, or no greater than about 0.2:1. In various embodiments, the molar ratio of the salt-forming cation to the anion of the auxin herbicide is from about 0.2:1 to about 0.8:1, from about 0.2:1 to about 0.75:1, from about 0.2:1 to about 0.7:1, from about 0.2:1 to about 0.65:1, from about 0.2:1 to about 0.6:1, from about 0.2:1 to about 0.55:1, from about 0.2:1 to about 0.5:1, from about 0.2:1 to about 0.45:1, from about 0.2:1 to about 0.4:1, from about 0.2:1 to about 0.35:1, from about 0.2:1 to about 0.3:1, from about 0.3:1 to about 0.8:1, from about 0.3:1 to about 0.75:1, from about 0.3:1 to about 0.7:1, from about 0.3:1 to about 0.65:1, from about 0.3:1 to about 0.6:1, from about 0.3:1 to about 0.55:1, from about 0.3:1 to about 0.5:1, from about 0.3:1 to about 0.45:1, from about 0.3:1 to about 0.4:1, from about 0.4:1 to about 0.8:1, from about 0.4:1 to about 0.75:1, from about 0.4:1 to about 0.7:1, from about 0.4:1 to about 0.65:1, from about 0.4:1 to about 0.6:1, from about 0.4:1 to about 0.55:1, from about 0.4:1 to about 0.5:1, from about 0.5:1 to about 0.8:1, from about 0.5:1 to about 0.75:1, from about 0.5:1 to about 0.7:1, from about 0.5:1 to about 0.65:1, from about 0.5:1 to about 0.6:1, from about 0.5:1 to about 0.55:1, from about 0.6:1 to about 0.8:1, from about 0.6:1 to about 0.75:1, or from about 0.6:1 to about 0.7:1. In these embodiments, the anions of the auxin herbicide that are not neutralized can be in acid form. Without being bound by theory, it is thought that the salt form or disassociated form of the auxin herbicide is more prone to react with the acetamide herbicide than the acid form of the auxin herbicide. Thus, increasing the amount of auxin herbicide acid present is thought to improve chemical stability. Also, using a greater portion of auxin herbicide acid lowers the pH of the composition and reduces the amount of acid that would otherwise be needed to reduce the pH of the composition under the aforementioned strategies.

A further strategy for improving chemical stability is incorporating an effective amount of alkylene glycol. Without being bound by theory, it is believe that the alkylene glycol forms a complex with the auxin herbicide, particularly the auxin herbicide in acid form. It is theorized that this complex is both unreactive and relatively non-volatile. In various embodiments, the alkylene glycol comprises a $C_2$ to $C_{10}$ glycol or more particularly a $C_2$ to $C_6$ glycol. In some embodiments, the alkylene glycol comprises a branched $C_2$ to $C_{10}$ or $C_2$ to $C_6$ glycol. Branched glycols have been found in some cases to provide even greater improvement in reducing auxin herbicide volatility. In certain embodiments, the alkylene glycol is selected from the group consisting of propylene glycol; hexylene glycol; 1,3-propanediol; 1,4-butanediol; 1,3-butanediol; and mixtures thereof.

Generally, at least an equimolar ratio of alkylene glycol to auxin herbicide is needed to impart improved chemical stability with higher amounts providing for even greater stability. In various embodiments, the molar ratio of alkylene glycol to auxin herbicide is at least about 1:1, at least about 1.5:1, at least about 2:1, at least about 2.5:1, at least about 3:1, at least about 3.5:1, or at least about 4:1. In some embodiments, the molar ratio of alkylene glycol to auxin herbicide is from about 1:1 to about 10:1, from about 2:1 to about 10:1, from about 3:1 to about 10:1, from about 4:1 to about 10:1, from about 1:1 to about 7.5:1, from about 2:1 to about 7.5:1, from about 3:1 to about 7.5:1, from about 4:1 to about 7.5:1, from about 1:1 to about 5:1, from about 2:1 to about 5:1, from about 3:1 to about 5:1, or from about 4:1 to about 5:1. In other terms, the alkylene glycol concentration can be at least about 5 wt. %, at least about 10 wt. %, at least about 15 wt. %, at least about 20 wt. %, at least about 25 wt. %, or at least about 30 wt. %. For example, the alkylene glycol concentration can be from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 40 wt. %, from about 15 wt. % to about 35 wt. %, from about 15 wt. % to about 30 wt. %, from about 20 wt. % to about 40 wt. %, from about 20 wt. % to about 35 wt. %, or from about 20 wt. % to about 30 wt. %.

Yet another strategy for improving chemical stability involves incorporating an organic acetamide herbicide diluent. Again, without being bound by theory, it is believed that the reaction between the acetamide herbicide and auxin herbicide necessarily requires contact of the herbicides. Acetamide herbicides typically have low water solubility. Thus, contact of the acetamide herbicide and auxin herbicide present in the aqueous phase requires mass transfer of the acetamide herbicide to the aqueuos phase and/or at least an interface of the oil and aqueous phases where reaction can occur. However, applicants have discovered that the mass transfer of the acetamide herbicide (in the oil phase) to the aqueous phase or interface can be reduced by incorporating an organic acetamide herbicide diluent. The weight ratio of acetamide herbicide to the organic acetamide herbicide diluent is typically at least about 1:10; at least about 1:5, at least about 1:2, at least about 1:1, at least about 2:1, at least about 3:1, or at least about 4:1. In various embodiments, the weight ratio of acetamide herbicide to the organic acetamide herbicide diluent is from about 1:10 to about 100:1, from about 1:5 to about 100:1, from about 1:2 to about 100:1, from about 1:1 to about 100:1, from about 2:1 to about 100:1, from about 3:1 to about 100:1, from about 4:1 to about 100:1, from about 1:10 to about 10:1, from about 1:5 to about 10:1, from about 1:2 to about 10:1, from about 1:1 to about 10:1, from about 2:1 to about 10:1, from about 3:1 to about 10:1, from about 4:1 to about 10:1, from about 1:10 to about 5:1, from about 1:5 to about 5:1, from about 1:2 to about 5:1, from about 1:1 to about 5:1, from about 2:1 to about 5:1, from about 3:1 to about 5:1, or from about 3:1 to about 4:1.

Further, the organic acetamide herbicide diluent can comprise a hydrocarbon-based solvent selected from the group consisting of paraffinic hydrocarbon solvents, aromatic hydrocarbon solvents, and combinations thereof, as described herein. In various embodiments, the organic acetamide herbicide diluent comprises a branched and/or linear alcohol. In some embodiments, the organic acetamide herbicide diluent comprises an aliphatic hydrocarbon. For example, the aliphatic hydrocarbon can comprise one or more $C_5$-$C_{20}$ branched and/or linear alkanes. In certain embodiments, the organic acetamide herbicide diluent comprises at least one compound selected from the group consisting of 2-ethyl-1-hexanol, 2-ethylhexane-1,3-diol, tetradecane, pentadecane, hexadecane, oleyl alcohol, octocrylene, and mixtures thereof. In various embodiments, the organic acetamide herbicide diluent comprises an aromatic hydrocarbon solvent comprising a naphthalenic hydrocarbon solvent (e.g., Aromatic 200).

In various embodiments, a protic solvent is preferred as the organic acetamide herbicide diluent. Hansen solubility parameters, particularly the H-bonding parameter, are used to measure the protic nature of a solvent. A high H-bonding parameter indicates that a solvent is more protic.

In view of these strategies, in various embodiments, the herbicidal compositions of the present invention comprise:
an oil phase comprising an acetamide herbicide; and
an aqueous phase comprising an aqueous solution comprising an auxin herbicide component comprising an anion of an auxin herbicide and a salt-forming cation, wherein the composition further includes one or more of the following features:
(i) a pH that is no greater than about 6, no greater than about 5.5, no greater than about 5, or no greater than 4.5;
(ii) a 1 wt. % auxin herbicide acid equivalent dilution of the composition has a pH that is no greater than about 4, no greater than about 3.75, or no greater than about 3.5;
(iii) a molar ratio of the salt-forming cation to the anion of the auxin herbicide that is no greater than about 0.8:1, no greater than about 0.75:1, no greater than about 0.7:1, no greater than about 0.65:1, no greater than about 0.6:1, no greater than about 0.55:1, no greater than about 0.5:1; no greater than about 0.45:1, no greater than about 0.4:1, no greater than about 0.35:1, no greater than about 0.3:1, no greater than about 0.25:1, or no greater than about 0.2:1;
(iv) an alkylene glycol; and/or
(v) an organic acetamide herbicide diluent and wherein the weight ratio of acetamide herbicide to the organic acetamide herbicide diluent is at least about 1:10; at least about 1:5, at least about 1:2, at least about 1:1, at least about 2:1, at least about 3:1, or at least about 4:1.

In some embodiments, the herbicidal composition includes at least two, at least three, at least four, or all of the features of (i), (ii), (iii), (iv), and (v).

The herbicidal composition can include any auxin herbicide e as mentioned herein. For example, the auxin herbicide can be selected from the group consisting of dicamba; 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; and mixtures thereof. In some embodiments, the auxin herbicide comprises dicamba. In further embodiments, the auxin herbicide comprises 2,4-D.

The salt-forming cation can include, for example, a cation of an amine, an alkali metal, or mixture thereof. In various embodiments, the salt-forming cation comprises a cation of an amine selected from the group consisting of ammonia, monoethanolamine, diethanolamine, triethanolamine, dimethylamine, diglycolamine, isopropylamine, and mixtures thereof. In some embodiments, the salt-forming cation comprises a cation of an alkali metal selected from the group consisting of sodium, potassium, and mixtures thereof.

The concentration of the auxin herbicide on an acid equivalent basis can be at least about 5 wt. %, at least about 10 wt. %, at least about 15 wt. %, at least about 20 wt. %, at least about 25 wt. %, or at least about 30 wt. %. In various embodiments, the concentration of the auxin herbicide on an acid equivalent basis is from about 5 wt. % to about 50 wt. %, from about 5 wt. % to about 40 wt. %, from about 5 wt. % to about 30 wt. %, from about 5 wt. % to about 20 wt. %, from about 5 wt. % to about 15 wt. %, from about 10 wt. % to about 50 wt. %, from about 10 wt. % to about 40 wt. %, from about 10 wt. % to about 30 wt. %, from about 10 wt. % to about 20 wt. %, or from about 10 wt. % to about 15 wt. %.

The herbicidal composition can include any acetamide herbicide as mentioned herein. For example, the acetamide herbicide can be selected from the group consisting of acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and mixtures thereof. In some embodiments, the acetamide herbicide is selected from the group consisting of acetochlor, alachlor, metolachlor, S-metolachlor, and mixtures thereof. In certain embodiments, the acetamide herbicide comprises acetochlor.

The concentration of the acetamide herbicide can be at least about 10 wt. %, at least about 15 wt. %, at least about 20 wt. %, at least about 25 wt. %, at least about 30 wt. %, at least about 35 wt. %, or at least about 40 wt. %. In various embodiments, the concentration of the acetamide herbicide is from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

The herbicide composition can further include any of the features as described herein with respect the pesticidal microemulsion.

The present invention also includes various methods of preparing the herbicidal compositions. Generally, the methods comprise mixing an oil phase comprising the acetamide herbicide with the aqueous solution comprising the auxin herbicide component comprising the anion of the auxin herbicide and the salt-forming cation to form the composition.

The present invention further includes various methods for controlling weeds in a field. Generally, the methods comprise applying the herbicidal composition as describe above, or dilution thereof to the field in an herbicidally effective amount.

Application of Pesticidal Macroemulsion

The present invention is also directed to various methods of applying the pesticidal application mixture.

In various embodiments, the pesticidal application mixture is a herbicidal application mixture used to control weeds in a field of crop plants. Commercially important crop plants include, for example, corn, soybean, cotton, dry beans, snap beans, and potatoes. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), *Bacillus thuringiensis* (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides, In other embodiments the crop plants are tolerant to glyphosate, dicamba, 2,4-D, MCPA, quizalofop, glufosinate and/or diclofop-methyl. In other embodiments, the crop plant is glyphosate and/or dicamba tolerant. In some embodiments of the present invention, crop plants are glyphosate and/or glufosinate tolerant. In other embodiments, the crop plants are glyphosate, glufosinate and dicamba tolerant. In these and other embodiments, the crop plants are tolerant to PPO inhibitors.

The herbicidal application mixture may be applied to the field according to practices known to those skilled in the art. In some embodiments, the herbicidal application mixture is applied to soil of the field, before planting the crop plants or after planting, but pre-emergent to the crop plants. In other embodiments, the herbicidal application mixture is applied to the field post-emergence of the crop plants and/or either before or after emergence of the weed. The herbicidally effective amount of the herbicidal application mixture to be applied is dependent upon various factors including the identity of the herbicides, the crop to be treated, and environmental conditions such as soil type and moisture content.

Herbicidal application mixtures of the present invention are useful for controlling a wide variety of weeds, i.e., plants that are considered to be a nuisance or a competitor of commercially important crop plants. Examples of weeds that may be controlled according to methods of the present invention include, but are not limited to, Meadow Foxtail (*Alopecurus pratensis*) and other weed species with the *Alopecurus* genus, Common Barnyard Grass (*Echinochloa crus-galli*) and other weed species within the *Echinochloa* genus, crabgrasses within the genus *Digitaria*, White Clover (*Trifolium repens*), Lambsquarters (*Chenopodium berlandieri*), Redroot Pigweed (*Amaranthus retroflexus*) and other weed species within the *Amaranthus* genus, Common Purslane (*Portulaca oleracea*) and other weed species in the *Portulaca* genus, *Chenopodium album* and other *Chenopodium* spp., *Setaria lutescens* and other *Setaria* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., *Conyza Canadensis* and other *Conyza* spp., and *Eleusine indica*. In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of *Amaranthus palmeri, Amaranthus rudis, Ambrosia artemisiifolia, Ambrosia trifida, Conyza bonariensis, Conyza canadensis, Digitaria insularis, Echinochloa colona, Eleusine indica, Euphorbia heterophylla, Lolium multiflorum, Lolium rigidum, Plantago lancelata, Sorghum halepense*, and *Urochloa panicoides*.

Improved Residual Control

The present invention includes compositions and methods for improved residual weed control. It has been discovered that incorporating a minor amount of a cationic flocculant polymer in the herbicidal compositions as described herein can provide for commercially acceptable rate of weed control for at least 28 days, at least 35 days, at least 42 days, or more. Without being bound by theory, it is believed that the cationic polymer binds to soil and to droplets of the oil phase. Consequently, transport of oil phase herbicides, such as acetamide herbicides, through pores in the soil matrix is believed to be reduced thereby increasing the amount of time the herbicide is at the soil surface.

In view of this discovery, in another embodiment of the present invention, the herbicidal composition comprises an oil phase comprising an acetamide herbicide; and an aqueous phase comprising an aqueous solution comprising an auxin herbicide component comprising an anion of an auxin herbicide and a salt-forming cation; and a cationic flocculant polymer. Cationic flocculant polymers are known in the field of wastewater conditioning. These polymers can have high molecular weights that exceed, for example, about 100,000 daltons, about 500,000 daltons, about 1,000,000 daltons, or even 10,000,000 daltons.

In various embodiments, the cationic flocculant polymer comprises at least one polymer selected from the group consisting of cationic polysaccharides, cationic derivatized polysaccharides, cationic modified acrylate polymers and co-polymers, cationic modified acrylamide polymers and co-polymers, high molecular weight proteins (e.g., gelatin), poly(diallyldimethylammonium chloride), cationic modified polyvinylpyrrolidone. In some embodiments, the cationic flocculant polymer comprises a cationic polysaccharide and/or a cationic derivatized polysaccharide. Polysaccharide can be selected from the group consisting of guar, chitosan, cellulosic polymers, galactomannans, and combinations thereof.

The concentration of the cationic flocculant polymer typically depends on the molecular weight of the polymer. Higher molecular weight polymers can be used in lower concentrations. Also, the amount of the cationic flocculant polymer is sufficient to cause weak flocculation. Accordingly, in various embodiments, the concentration of the cationic flocculant polymer is from about 0.001 wt. % to about 1 wt. %, from about 0.01 wt. % to about 1 wt. %, from about 0.1 wt. % to about 1 wt. %, from about 0.001 wt. % to about 0.1 wt. %, from about 0.001 wt. % to about 0.01 wt. %, or from about 0.01 wt. % to about 0.1 wt. %.

Other Additives

The compositions described herein can further include other additives. Other useful additives include, for example, biocides or preservatives (e.g., PROXEL, commercially available from Avecia), antifreeze agents (such as glycerol, sorbitol, or urea), antifoam agents (such as Antifoam SE23 from Wacker Silicones Corp.), and drift control agents.

Drift control agents suitable for the compositions and methods of the present invention are known to those skilled in the art and include GARDIAN, GARDIAN PLUS, DRI-GARD, and PRO-ONE XL available from Van Diest Supply Co.; COMPADRE, available from Loveland Products, Inc.; BRONC MAX EDT, BRONC PLUS DRY EDT, EDT CONCENTRATE, and IN-PLACE available from Wilbur-Ellis Company; STRIKE ZONE DF available from Helena Chemical Co.; INTACT and INTACT XTRA available from Precision Laboratories, LLC; and AGRHO DR 2000 and AGRHO DEP 775 available from the Solvay Group. Suitable drift control agents include, for example, guar-based (e.g., containing guar gum or derivatized guar gum) drift control agents. Various drift control products may also contain one or more water conditioning agent in combination with the drift control agent(s).

The herbicidal compositions described herein can further comprise an additive to control or reduce potential herbicide volatility. Under some application conditions, certain herbicides such as auxin herbicides, can vaporize into the surrounding atmosphere and migrate from the application site to adjacent crop plants, such as soybeans and cotton, where contact damage to sensitive plants can occur. For example, as described in U.S. Application Publication Nos. 2014/0128264 and 2015/0264924, which are incorporated herein by reference, additives to control or reduce potential herbicide volatility include monocarboxylic acids, or salts thereof (e.g., acetic acid and/or an agriculturally acceptable salt thereof. Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In particular, the monocarboxylic acid can be selected from the group consisting of formic acid, acetic acid, propionic acid, and benzoic acid. The monocarboxylate salt can be selected from the group consisting of formate salts, acetate salts, propionate salts, and benzoate salts. The monocarboxylate salts can include, for example, alkali metal salts selected from sodium and potassium. Preferred monocarboxylate salts include sodium acetate and potassium acetate. The molar ratio of herbicide (e.g., auxin herbicide) to the monocarboxylic acid, or monocarboxylate thereof, can be typically from about 1:10 to about 10:1, from about 1:5 to about 5:1, from about 3:1 to about 1:3, or from about 2:1 to about 1:2 (e.g., about 1:1).

Having described the invention in detail, it will be apparent that modifications and variations are possible without departing from the scope of the invention defined in the appended claims.

EXAMPLES

The following non-limiting examples are provided to further illustrate the present invention.

General Formulation Procedure

The following is the general formulation procedure for preparing the non-water-continuous, herbicidal microemulsion compositions described in the Examples below:
i) When using a solid stabilizing surfactant, the surfactant was dissolved in a suitable lipophilic, oily liquid, such as hydrocarbon-based solvent ISOPAR M, at an amount of about 50-80% by weight of the surfactant;
ii) The required amounts of the surfactant solution, and the portion of the oil phase that contains a lipophilic, oily liquid, and/or an oily herbicide, and/or solution of an oil-soluble herbicide dissolved in a lipophilic, oily liquid along with any herbicide safener were mixed under agitation until the oil phase mixture appeared uniform;
iii) Under agitation, the components of the aqueous phase including water and optionally one or more weak-acid, ionic agrochemicals, such as a salt of dicamba and/or fomesafen, were mixed into the oil phase mixture;
iv) Under continued agitation, other additives such as dielectricity modifier, pH-adjustment agents, deionized water, etc., were mixed as needed; and
v) Agitation continued until the mixture appeared uniform and optically transparent.

General Test Procedure

The procedure for determining the non-water-continuous property of the herbicidal microemulsion compositions is as follows:
i) The prepared compositions were diluted by from about 0.5 to about 1-4 times their weight with their respective oil phase, including any dielectricity-modifier contained therein, under agitation. Non-water-continuous microemulsion compositions resulted in transparent or translucent mixtures, wherein the translucent mixtures can turn into transparent mixtures with a sufficient supplementary addition of the stabilizing surfactant.
ii) The prepared compositions were diluted by from about 0.5 to about 1-4 times their weight with deionized water. Non-water-continuous microemulsion compositions resulted in opaque, milky oil-in-water macroemulsions.

Example 1

Non-water-continuous herbicidal microemulsion compositions were prepared in accordance with the General Formulation Procedure by first combining oil-phase components acetochlor (active content 96.1 wt. %), a safener (furilazole, (RS)-3-dichloroacetyl-5-(2-furyl)-2,2-dimethyloxazolidine), a hydrocarbon solvent (ISOPOAR M (a isoparaffinic solvent, commercially available from Exxon-Mobil Chemical)), and an anionic surfactant, sodium dioctyl sulfosuccinate, together followed by mixing with deionized water. The anionic surfactant was incorporated into the compositions as a 70 wt. % solution of the surfactant in the hydrocarbon solvent. Details of the compositions are presented in Table I.

The surfactant demand index (SDI) was calculated as the weight of anionic surfactant divided by the weight of the aqueous phase (deionized water). Stability was determined by heating the compositions at approximately 54° C. for about 16 hours.

TABLE I

| Comp. No. | SDI | Stability | Non-water-continuous Phase ||||| Aqueous Phase DI Water (g) |
| | | | Acetochlor (g) | Furilazole (Safener) (g) | ISOPARM (g) | Sodium dioctyl sulfo-succinate (g) | |
|---|---|---|---|---|---|---|---|
| 1-1 | 1.96 | No micro-emulsion | 5.83 | 0.19 | 0.44 | 1.02 | 0.52 |
| 1-2 | 2.49 | No micro-emulsion | 5.83 | 0.19 | 0.44 | 1.02 | 0.41 |
| 1-3 | 4.08 | Stable | 5.83 | 0.19 | 0.44 | 1.02 | 0.25 |

Table I shows that compositions formulated as a non-water-continuous Winsor Type IV microemulsions (Composition 1-3) typically require a relatively high amount of stabilizing surfactant relative to the aqueous phase. As evident from Table I, a SDI value of as high as 4.08 (Composition 1-3) was required to form a stable non-water-continuous microemulsion with deionized water (i.e., water with a negligible ionic strength) as the aqueous phase. Compositions 1-1 and 1-2 did not form stable non-water-continuous microemulsions.

Example 2

Non-water-continuous herbicidal microemulsion compositions were prepared in accordance with General Formulation Procedure. Details of the compositions are presented in Table II. In these compositions, the aqueous phase was an aqueous solution of monoethanolamine (MEA)-dicamba (34.8 wt. %). Based on the acid-equivalence of dicamba, the neutralization level of dicamba in the aqueous solution was at least about 100%, which is referred to herein as "full neutralization." Monoethanolamine was used as the neutralizing agent. Stability was determined by heating the compositions to 54° C. for about 16 hours and by freeze-thawing (i.e., freezing the compositions at −20° C. for at least 24 hours followed by thawing).

Table II shows that a relatively high concentration of surfactant is required to stabilize a non-water-continuous Winsor Type IV microemulsion. A stable non-water-continuous microemulsion could not be produced with SDI values in the range of about 0.4-0.8. Instead, an SDI value of about 0.88 was required for producing a stable microemulsion. Notably, Composition 2-2 which contained 11.8 wt. % of a surfactant did not meet the targeted SDI value of 0.65 or less.

A composition similar to Composition 2-1 was also prepared, except that the aqueous phase was a 34.8 wt. % aqueous solution of dicamba as a sodium salt (e.g., neutralized with sodium hydroxide). However, this composition was unstable.

Example 3

Non-water-continuous herbicidal microemulsion compositions were prepared in accordance with the General Formulation Procedure. Details of the compositions are presented in Table III. The microemulsion compositiosn contained acetochlor (active content 96.1 wt. %) and the aqueous phase was either MEA-dicamba (34.8 wt. %) solution or MEA-dicamba (55.8 wt. %) solution. Stability was determined by heating the microemulsions at 54° C. for about 16 hours and by freeze-thawing (i.e., freezing the compositions at −20° C. for at least 24 hours followed by thawing).

TABLE II

| Comp. No. | SDI | Stability | Non-water-continuous Phase ||||| Aqueous Phase MEA-dicamba solution 34.8 wt. % (g) |
| | | | Acetochlor (g) | Furilazole (Safener) (g) | ISOPARM (g) | Sodium dioctyl sulfo-succinate (g) | |
|---|---|---|---|---|---|---|---|
| 2-1 | 0.80 | No micro-emulsion | 5.83 | 0.19 | 0.44 | 1.02 | 1.28 |
| 2-2 | 0.88 | Stable | 5.83 | 0.19 | 0.44 | 1.02 | 1.16 |

TABLE III

| Comp. No. | SDI | Stability | Non-water-continuous Phase | | | | Aqueous Phase | |
|---|---|---|---|---|---|---|---|---|
| | | | Acetochlor (g) | Furilazole (Safener) (g) | ISOPARM (g) | Sodium dioctyl sulfo-succinate (g) | MEA-dicamba solution 34.8 wt. % (g) | MEA-dicamba solution 55.8 wt. % (g) |
| 3-1 | 0.40 | Stable | 5.83 | 0.19 | 0.44 | 1.02 | | 2.56 |
| 3-2 | 0.40 | No microemulsion | 5.83 | 0.19 | 0.44 | 1.02 | 2.55 | |

Composition 3-1 formed a stable non-water-continuous microemulsion, while composition 3-2 did not. Thus, as shown in Table III, raising the ionic strength of the aqueous phase by increasing the amount of a weak-acid, ionic herbicide (dicamba) enables reaching the targeted SDI value of no greater than 0.65. An SDI value of about 0.88 was required in order to produce a stable microemulsion with the lower amount (i.e., 34.8 wt. %) of dicamba in the aqueous phase (see Example 2).

The specific gravity of dicamba is about 1.57 at 25° C. Accordingly, the specific gravity would be higher for the 55.8 wt. % solution than for the 34.8 wt. % solution of dicamba. Nonetheless, the difference in volume for a given weight of the two solutions, does not account for the large difference in the SDI values of about 0.88 and about 0.4 that were required for producing stable, non-water-continuous microemulsions with the two different dicamba solutions tested.

Example 4

Non-water-continuous herbicidal microemulsion compositions were prepared in accordance with the General Formulation Procedure. Details of the compositions are presented in Table IV. The aqueous phase was either a 35 wt. % sodium dicamba solution or deionized water. Compositions 4-1 through 4-11 contained the sodium dicamba solution, and compositions 4-12 through 4-14 contained deionized water. The aqueous solution of the sodium dicamba salt was produced by fully neutralizing dicamba with sodium hydroxide in an aqueous solution.

In addition, dielectricity modifiers were added to some of the compositions. The dielectricity modifiers used were: ethylene glycol phenyl ether; diethylene glycol butyl ether; dipropylene glycol butyl ether; 2-ethylhexane-1,3-diol; hexylene glycol; 2-ethyl-1-hexanol; and propylene carbonate. The amount of the dielectricity modifier provided in Table IV for Compositions 4-1 through 4-8 was slightly higher than the minimum amount that was required for the compositions to be non-water-continuous, Winsor Type IV microemulsions. Compositions 4-9, 4-10, 4-12, 4-13, and 4-14 did not form stable non-water-continuous microemulsions.

TABLE IV

| Comp. No. | SDI | Microemulsion formed? | Non-water-continuous Phase | | | | Aqueous Phase Sodium-Dicamba Solution, (35 wt. % Dicamba)[1] or Deionized Water[2] (g) | Dielectricity modifier (g) |
|---|---|---|---|---|---|---|---|---|
| | | | Acetochlor (g) | Furilazole (Safener) (g) | ISOPARM (g) | Sodium dioctyl sulfo-succinate (g) | | |
| 4-1 | 0.33 | Yes | 5.07 | 0.97 | 0.34 | 0.8 | 2.4 [1] | 1.5 (Ethylene glycol phenyl ether) |
| 4-2 | 0.33 | Yes | 5.07 | 0.97 | 0.34 | 0.8 | 2.4 [1] | 1.5 (Ethylene glycol phenyl ether) |
| 4-3 | 0.33 | Yes | 5.07 | 0.97 | 0.34 | 0.8 | 2.4 [1] | 1.5 (Diethylene glycol butyl ether) |
| 4-4 | 0.33 | Yes | 5.07 | 0.97 | 0.34 | 0.8 | 2.4 [1] | 1.75 (Dipropylene glycol butyl ether) |
| 4-5 | 0.33 | Yes | 5.07 | 0.97 | 0.34 | 0.8 | 2.4 [1] | 1.5 (2-Ethylhexane-1,3-diol) |
| 4-6 | 0.33 | Yes | 5.07 | 0.97 | 0.34 | 0.8 | 2.4 [1] | 1.7 (Hexylene glycol) |
| 4-7 | 0.50 | Yes | 5.07 | 0.97 | 0.52 | 1.21 | 2.4 [1] | 1.4 (2-Ethyl-1-hexanol) |

TABLE IV-continued

| Comp. No. | SDI | Micro-emulsion formed? | Non-water-continuous Phase | | | | Aqueous Phase Sodium-Dicamba Solution, (35 wt. % Dicamba)[1] or Deionized Water[2] (g) | Dielectricity modifier (g) |
|---|---|---|---|---|---|---|---|---|
| | | | Acetochlor (g) | Furilazole (Safener) (g) | ISOPARM (g) | Sodium dioctyl sulfo-succinate (g) | | |
| 4-8 | 0.58 | Yes | 5.07 | 0.97 | 0.6 | 1.4 | 2.4 [1] | 1.75 (Propylene carbonate) |
| 4-9 | 0.67 | No | 5.07 | 0.97 | 0.68 | 1.6 | 2.4 [1] | — |
| 4-10 | 0.96 | No | 5.07 | 0.97 | 0.98 | 2.3 | 2.4 [1] | — |
| 4-11 | 1.02 | Yes | 5.07 | 0.97 | 1.05 | 2.45 | 2.4 [1] | — |
| 4-12 | 0.40 | No | 5.07 | 0.97 | 0.34 | 0.8 | 2 [2] | 2.5 (Ethylene glycol phenyl ether) |
| 4-13 | 0.40 | No | 5.07 | 0.97 | 0.34 | 0.8 | 2 [2] | 2.7 (Hexylene glycol) |
| 4-14 | 0.61 | No | 5.07 | 0.97 | 0.52 | 1.21 | 2 [2] | 2.75 (2-Ethyl-1-hexanol) |

The results show that without addition of a dielectricity modifier, the SDI is much higher than 0.65 in microemulsion compositions containing an aqueous solution of a sodium-salt of dicamba as the aqueous phase. On the other hand, even with relatively high additions of the dielectricity modifiers, it was not possible to produce a microemulsion when the aqueous phase is deionized water, rather than an equal volume of sodium dicamba solution.

Compositions 4-1 through 4-8 resulted in the targeted SDI value of no greater than 0.65. As compared to Compositions 4-9 through 4-11, the SDI value decreases significantly reaching the targeted value for Compositions 4-1 through 4-8 when a dielectricity modifier was added to the Compositions. Notably, this SDI-reduction effect is found in the compositions where the aqueous phase was an aqueous solution (with a specific gravity of about 1.2) of a sodium dicamba, but not when the aqueous phase is replaced with an equal volume of deionized water.

Example 5

Non-water-continuous herbicidal microemulsion compositions were prepared in accordance with the General Formulation Procedure. The anionic stabilizing surfactant was sodium dihexyl sulfosuccinate, which was supplied as an 80 wt. % solution in a water-ethanol mixture. A nonionic surfactant blend containing an ethylene oxide-propylene oxide block copolymer surfactant (commercially available from Stepan Company as Stepan Agent 1690 92N) was also added. Potassium dicamba was used as the salt of a weak acid, ionic herbicide. The composition of the aqueous solution of a fully-neutralized potassium salt of dicamba is given in Table V. A safener mix containing 19.56 wt. % furilazole and 75.44 wt. % acetochlor was also added to the compositions. Details of the compositions are presented in Table VI.

Stability was determined by freezing the compositions at −20° C. for at least 24 hours followed by thawing.

TABLE V

| Ingredient | Weight % |
|---|---|
| Dicamba Solid (98.3% Active) | 49.29 |
| 88.5% Potassium Hydroxide Pellets | 14.06 |
| Deionized Water | 36.65 |

TABLE VI

| Comp. No. | Freeze-thaw Stability | SDI | Acetochlor (g) | Safener Mix (g) | sodium dihexyl sulfo-succinate (g) | Nonionic Surfactant (g) | Aqueous Potassium Dicamba Solution (g) | Dielectricity Modifier (2-Ethyl 1-hexanol) (g) |
|---|---|---|---|---|---|---|---|---|
| 5-1 | Poor | 0.60 | 44.34 | 7.86 | 18.75 | — | 25.05 | 4.0 |
| 5-2 | Good | 0.52 | 42.69 | 7.57 | 15.63 | — | 24.12 | 10.0 |
| 5-3 | Good | 0.41 | 43.16 | 7.65 | 11.56 | 0.75 | 24.38 | 12.5 |

The results in Table VI show that when a sufficient amount of a dielectricity modifier such as 2-ethyl 1-hexanol (dielectric constant of about 7.7 at 20° C.) is added, the targeted SDI of no greater than 0.65 is met and freeze-thaw stability is enhanced.

Example 6

Non-water-continuous herbicidal microemulsion compositions were prepared in accordance with the General Formulation Procedure. Details of the compositions are presented in Table VII. The acetochlor added to the compositions contained 96.1% active. The compositions in Table VII also contained a safener mix comprising 19.56 wt. % furilazole and 75.44 wt. % acetochlor. In addition, dielectricity modifiers were added to the microemulsions. The various dielectricity modifiers tested were octanol, decanol, dodecanol, oleyl alcohol, 2-ethyl 1-hexanol, dipropylene glylcol n-butyl ether, ethylene glycol phenyl ether, propylene carbonate, and butylene carbonate. The anionic surfactant was sodium bis(tridecyl) sulfosuccinate (SBS), which was added as a 70 wt. % solution of the surfactant in ISOPAR M. The nonionic surfactant was a surfactant blend containing an ethylene oxide-propylene oxide block copolymer surfactant (commercially available from Stepan Company as Stepan Agent 1690 92N). The composition of the dicamba solution is provided in Table V above.

Stability was determined by freezing the compositions at −20° C. for at least 24 hours followed by thawing.

The results show that i) a long-chain ($C_8$) branched alcohol (Composition 6-5) can be more effective than its linear analog (see Composition 6-1); and ii) a less polar dielectricity modifier with a relatively low aqueous solubility of less than 5% by weight (e.g., 2-ethyl 1-hexanol, dipropylene glycol n-butyl ether, ethylene glycol phenyl ether) can be more effective than a more polar dielectricity modifier with a higher aqueous solubility (e.g., propylene carbonate, butylene carbonate), in providing for improved freeze-thaw stability.

The amounts of the dielectricity modifiers shown in Table VII for various compositions were about the minimum amount for these compositions to be non-water-continuous microemulsions. It may be noted that a composition closely resembling the compositions in Table VII on dielectricity modifier-free basis, and with an SDI value of about 0.49 (nearly identical to that of the mixtures in Table VII), comprising the potassium-dicamba solution of Table V, and a more polar dielectricity modifier such as hexylene glycol, exhibited a poor freeze-thaw stability.

Example 7

Non-water-continuous herbicidal microemulsions were prepared in accordance with the General Formulation Procedure. Details of the compositions are presented in Table VIII. The acetochlor added to the compositions contained 96.1% active. The aqueous phase was an aqueous solution of monoethanolamine (MEA)-dicamba (55.8 wt. %) solution. Additionally, the microemulsions contained PEG 30 dipolyhydroxystearate (PEG 30) which is an oil-soluble, ethoxylated, nonionic block copolymer surfactant.

TABLE VII

| Comp. No. | Freeze-thaw Stability | Dielectricity Modifier | Dielectricity Modifier (g) | Acetochlor (g) | Safener Mix (g) | SBS (g) | Nonionic Surfactant (g) | Dicamba Solution (g) |
|---|---|---|---|---|---|---|---|---|
| 6-1 | Poor | octanol | 0.55 | 4.58 | 0.8 | 1.07 | 0.5 | 2.55 |
| 6-2 | Poor | decanol | 0.65 | 4.58 | 0.8 | 1.07 | 0.5 | 2.55 |
| 6-3 | Poor | dodecanol | 0.5 | 4.58 | 0.8 | 1.07 | 0.5 | 2.55 |
| 6-4 | Poor | oleyl alcohol | 0.8 | 4.58 | 0.8 | 1.07 | 0.5 | 2.55 |
| 6-5 | Good | 2-ethyl-1-hexanol | 0.5 | 4.58 | 0.8 | 1.07 | 0.5 | 2.55 |
| 6-6 | Good | dipropylene glycol n-butyl ether | 0.4 | 4.58 | 0.8 | 1.07 | 0.5 | 2.55 |
| 6-7 | Good | ethylene glycol phenyl ether | 0.2 | 4.58 | 0.8 | 1.07 | 0.5 | 2.55 |
| 6-8 | Poor | propylene carbonate | 0.7 | 4.58 | 0.8 | 1.07 | 0.5 | 2.55 |
| 6-9 | Poor | butylene carbonate | 1.1 | 4.58 | 0.8 | 1.07 | 0.5 | 2.55 |

TABLE VIII

| Comp. No. | SDI | Non-water-continuous Phase | | | | | Aqueous Phase |
|---|---|---|---|---|---|---|---|
| | | Acetochlor (g) | Furilazole (Safener) (g) | ISOPAR (g) | SDS (g) | PEG 30 (g) | MEA-Dicamba (g) |
| 7-1 | 0.333 | 5.83 | 0.19 | 0.26 | — | 0.86 | 2.58 |
| 7-2 | 0.333 | 5.83 | 0.19 | 0.26 | 0.62 | 0.23 | 2.55 |
| 7-3 | 0.313 | 5.83 | 0.19 | 0.34 | 0.8 | — | 2.56 |
| 7-4 | 0.331 | 5.83 | 0.19 | 0.37 | 0.85 | — | 2.58 |

Compositions 7-2 and 7-4 formed stable non-water-continuous microemulsions while Compositions 7-1 and 7-3 were unstable. The results show that PEG 30 dipolyhydroxystearate alone was not an effective stabilizing surfactant for these compositions. However, a relatively small addition of the surfactant provides for the potential of using a lesser amount of the primary stabilizing surfactant such as sodium dioctyl sulfosuccinate (SDS) in producing an stable non-water-continuous microemulsions (Compositions 7-2 and 7-4). Furthermore, it was found that the addition of PEG(30) dipolyhydroxystearate aided the inversion from non-water-continuous microemulsion to water-continuous oil-in-water (O/W) macroemulsion upon substantial dilution of the microemulsion compositions with water.

Example 8

Non-water-continuous herbicidal microemulsion compositions were prepared in accordance with the General Formulation Procedure. Details of the compositions are presented in Table IX. The stabilizing surfactant system of the compositions was a mixture of i) an oil-soluble and water-insoluble, alkylaryl anionic surfactant such as ethoxylated tallow amine salt of nonylphenol ether sulfate (commercially available from Stepan Company); and ii) an oil-dispersible and water-soluble, non-ionic surfactant blend (commercially available from Stepan Company) comprising an ethylene oxide (EO) propylene oxide (PO) block copolymer. The SDI value was calculated after subtracting the amount of hexylene glycol contained in the respective dicamba salt solution (Table X) from the total amount of dicamba salt solution contained in the compositions listed in Table IX. Compositions 8-1 and 8-2 contained diglycolamine (DGA)-dicamba salt solution. Composition 8-3 contained monoethanolamine (MEA)-dicamba salt solution. The respective compositions of the dicamba salt solutions, diglycolamine (DGA) and monoethanolamine (MEA), are given in Table X.

TABLE X

| Dicamba Salt Solution | Ingredient, Weight % | | | | |
|---|---|---|---|---|---|
| | Dicamba Solid, (98.3% Active) | Deionized Water | DGA | MEA | Hexylene Glycol |
| DGA | 55.29 | 14.69 | 25.86 | — | 4.16 |
| MEA | 56.28 | 14.47 | — | 15.29 | 13.96 |

In greenhouse testing for weed control, the compositions presented in Table IX showed equivalent weed control, as compared to tank mixes of acetochlor and an aqueous solution of a diglycolamine salt of dicamba. Also, Composition 8-1 showed about 80-95% control of both broadleaf and narrow-leaf weeds, as determined based on multi-site field testing of the composition. The percent weed control noted above was determined by conventional methods for rating the extent of weed control by herbicides.

Example 9

Non-water-continuous herbicidal microemulsion compositions were prepared in accordance with the General Formulation Procedure. Details of the compositions are presented in Table XI. The compositions contained an oil-soluble, monoalkyl anionic surfactant which is an alkyl ether phosphate ester, namely, aliphatic $C_{10}$ ethoxylate phosphate mono-ester in acid-form (MAPHOS A, which is available from BASF). The alkyl ether phosphate ester was supplied in a solution containing about 96 wt. % of the surfactant. The oil phase included acetochlor, which was provided by a 96.1 wt. % active ingredient solution. The aqueous phase was an aqueous solution of a salt of a weak-acid, ionic herbicide, dicamba. The compositions also contained the safener mix as described in Example 5. The dielectricity modifier used was 2-ethyl 1-hexanol.

The SDI values listed in Table XI were calculated, based on the total amounts of the dicamba salt solution, 50 wt. % sodium hydroxide solution, and deionized water as being the respective amounts of the aqueous phase. Notably, these compositions were found to exhibit substantial chemical

TABLE IX

| Comp. No. | SDI | Acetochlor | Furilazole (Safener) (g) | Aromatic 200 | Anionic Surfactant | Nonionic Surfactant | Dicamba Salt Solution | Hexylene Glycol | Antifoam, Dye |
|---|---|---|---|---|---|---|---|---|---|
| 8-1 | 0.45 | 54.19 | 1.67 | 7.22 | 6.14 | 4.09 | 23.54 | 3.06 | 0.096 |
| 8-2 | 0.57 | 52.76 | 1.62 | 7.03 | 7.50 | 5.00 | 22.92 | 3.08 | 0.093 |
| 8-3 | 0.62 | 54.41 | 1.67 | 7.25 | 7.50 | 5.00 | 23.29 | 0.79 | 0.096 | stability for acetochlor with less than 5 wt. % degradation of acetochlor upon storage at 40° C. for 6-8 weeks.

The pH of the compositions was measured by placing a pH-probe directly into the compositions, and recording the pH value after a period of 6 minutes. It was found that the pH range of 3.7-4.8 was more effective for providing high chemical stability of acetochlor as compared to a higher pH. These compositions were also found to invert easily into oil-in-water macroemulsions upon substantial dilution with water.

TABLE XI

| | | | | | Ingredient, Weight % | | | | |
|---|---|---|---|---|---|---|---|---|---|
| Comp. No. | SDI | pH | Acetochlor | Safener Mix | Alkyl Ether Phosphate Ester | Dicamba Salt Solution | NaOH Solution | DI Water | 2-ethyl 1-hexanol |
| 9-1 | 0.46 | 3.7 | 43.30 | 7.67 | 13.54 | 24.72 (A) | 0.80 | 2.50 | 7.5 |
| 9-2 | 0.46 | 3.9 | 43.10 | 7.64 | 13.54 | 24.57 (A) | 1.15 | 2.50 | 7.5 |
| 9-3 | 0.50 | 3.9 | 38.75 | 6.87 | 13.54 | 22.09 (A) | 1.25 | 2.50 | 15.0 |
| 9-4 | 0.50 | 4.3 | 38.41 | 6.81 | 13.54 | 21.90 (A) | 1.85 | 2.50 | 15.0 |
| 9-5 | 0.57 | 3.9 | 28.56 | 5.06 | 13.54 | 22.33 (B) | 0.50 | — | 30.0 |
| 9-6 | 0.56 | 4.8 | 26.87 | 4.76 | 13.54 | 21.38 (C) | 1.80 | — | 31.64 |
| 9-7 | 0.52 | 4.3 | 45.65 | 8.09 | 13.54 | 22.72 (D) | — | 2.50 | 7.5 |

(A), (B), (C), (D): Dicamba salt solutions are specified in Table XII.

TABLE XII

| | Ingredient, Weight % | | | |
|---|---|---|---|---|
| Dicamba Salt Solution | Dicamba Solid, 98.3% Active | DI Water | 50 Wt. % Sodium Hydroxide[1], or MEA[2] | Propylene Glycol |
| 2 (referred to in Table XI): Sodium salt of dicamba dissolved in a mixture of water and propylene glycol | 48.83 | 20.3 | 10.60 [1] | 20.27 |
| 3 (referred to in Table XI) Sodium salt of dicamba dissolved in water | 35.65 | 51.67 | 12.68 [1] | — |
| 4 (referred to in Table XI) Sodium salt of dicamba dissolved in water | 35.00 | 52.49 | 12.51 [1] | — |
| 5 (referred to in Table XI) Monoethanolamine salt of dicamba dissolved in water | 55.97 | 28.83 | 15.20 [2] | — |

Table XII shows the compositions of the dicamba salt solutions for the compositions in Table XI. The aqueous solubility of fully neutralized (i.e., up to a molar equivalence of 1) sodium salt of dicamba was about 35 wt. % acid equivalent. For Dicamba Salt Solution #2, the amount of solubilized dicamba in an aqueous solution of its sodium salt increased by neutralizing dicamba up to a molar equivalence of approximately 0.61 in a mixture of water and propylene glycol.

Example 10

Non-water-continuous herbicidal microemulsion compositions were prepared in accordance with the General Formulation Procedure. The ingredients of the microemulsion compositions are provided in Table XIII The compositions contained acetochlor supplied as a 96.1 wt. % active and dicamba salt solution. The composition of the dicamba salt solution is given in Table XIV. The compositions also contained either i) laureth-4-carboxylic acid as a 100 wt. % active (Composition 10-1) or ii) sodium laureth-6-carboxylate as a 82.7 wt. % active aqueous solution (Composition 10-2) as the stabilizing surfactant. Composition 10-1 contained ethylene glycol n-butyl ether as the dielectricity modifier, while Composition 10-2 contained 2-ethyl 1-hexanol. The compositions also contained the safener mix described in Example 5. The SDI was calculated as described in Example 8.

TABLE XIII

| | | Ingredient, Weight % | | | | | | |
|---|---|---|---|---|---|---|---|---|
| Comp. No. | SDI | Acetochlor | Safener Mix | laureth-4-carboxylic acid | sodium laureth-6-carboxylate | Dicamba Salt Solution | 50 Wt % NaOH | Dielectricity Modifier |
| 10-1 | 0.437 | 37.62 | 6.67 | 11.5 | — | 31.41 | 1.8 | 11.0 |
| 10-2 | 0.614 | 25.84 | 4.58 | — | 15.24 | 21.6 | 0.8 | 31.94 |

TABLE XIV

| Dicamba Salt Solution | Ingredient, Weight % | | | |
|---|---|---|---|---|
| | Dicamba Solid 98.3% Active | DI Water | 50 Wt. % Sodium Hydroxide | Hexylene Glycol |
| | 33.34 | 35.33 | 12.31 | 19.02 |

The results show that oil-soluble or oil-dispersible ethoxylated, monoalkyl anionic surfactants such as laureth-4 carboxylic acid and sodium laureth-6 carboxylate are suitable as stabilizing surfactants for the non-water-continuous, herbicidal microemulsion compositions. These compositions were also found to invert easily into oil-in-water macroemulsions upon substantial dilution with water.

Example 11

Non-water-continuous herbicidal microemulsion compositions were prepared in accordance with the General Formulation Procedure except that a gelled aqueous solution of a dicamba salt was used as the aqueous phase. The ingredients of the microemulsion compositions are provided in Table XV. The composition of the gelled aqueous solution of a potassium salt of dicamba is given in Table XVI. The gelling agent was a polysaccharide polymer, xanthan gum.

The results of this Example confirm the non-water-continuous nature of the herbicidal microemulsion compositions containing an oily herbicide, acetochlor, and a gelled aqueous solution of a salt of a weak-acid, ionic herbicide, dicamba. These compositions did not show any gelling or substantial viscosity-increase due to the incorporation of a gelled aqueous solution of a dicamba-salt, confirming that the aqueous solution is the aqueous phase. If the gelled aqueous solution was present in the continuous phase, then the compositions would have shown instead a gel-like appearance.

TABLE XV

| | Weight % | |
|---|---|---|
| Ingredient | Comp. No. 11-1 | Comp. No. 11-2 |
| Acetochlor, 96.1% (w/w) Active | 27.20 | 31.40 |
| Safener Mix (Same as in Example 5) | 4.82 | — |
| Sodium Laureth-6 Carboxylate (82.7 wt % active, Same as in Example 10) | 15.21 | — |
| Alkyl Ether Phosphate Ester (96 wt. % active, Same as in Example 9) | — | 13.23 |
| Gelled Dicamba Salt Solution (Potassium Salt) | 19.16 | 19.26 |
| 2-Ethyl 1-hexanol | 32.59 | 31.40 |
| 50 wt. % Solution of Sodium hydroxide | 1.02 | 4.71 |

TABLE XVI

| Ingredient, Weight % | | | | |
|---|---|---|---|---|
| Dicamba Solid, 98.3% Active | Deionized Water | KOH, 45 Wt. % Solution | Xanthan Gum | Proxel GL (Preservative) |
| 39.80 | 37.13 | 22.06 | 1.002 | 0.013 |

Example 12

Non-water-continuous herbicidal microemulsion compositions were prepared in accordance with the General Formulation Procedure. The ingredients of the microemulsion compositions are provided in Table XVII.

TABLE XVII

| | Ingredient, Weight % | | | |
|---|---|---|---|---|
| Ingredient | Comp. No. 12-1 | Comp. No. 12-2 | Comp. No. 12-3 | Comp. No. 12-4 |
| Acetochlor (96.1% (w/w) active) | 36.305 | 36.305 | 36.305 | 34.897 |
| Alkyl Ether Phosphate Ester (96 wt. % active, Same as in Example 9) | 13.247 | 13.247 | 13.247 | 12.733 |
| Dicamba Salt Solution (Sodium Salt, Same as #4 in Table XII) | 29.084 | 29.084 | 29.084 | 27.956 |
| 2-Ethyl 1-hexanol | — | 10.657 | 21.365 | 24.414 |
| 2-Ethyl-1,3-hexanediol | 21.365 | 10.707 | — | — |

These compositions were tested for handling characteristics. Compositions 12-1 and 12-2 showed a non-viscous, easy-pour consistency, while Compositions 12-3 and 12-4 had a viscous, gel-like consistency. The results of this test also show that a mixture of dielectricity modifiers (e.g., 2-ethyl 1-hexanol and 2-ethyl-1,3-hexanediol) can be beneficial over a single dielectricity modifier.

Example 13

Non-water-continuous herbicidal microemulsion compositions were prepared in accordance with the General Formulation Procedure. Details of the compositions are presented in Table XVII. The oil phase of the compositions contained an oily herbicide, acetochlor, and the aqueous phase contained an aqueous solution of a salt of a weak-acid, ionic herbicide, fomesafen. The composition of the fomesafen salt solution is provided in Table XIX. The fomesafen salt solution was centrifuged to remove a small amount of insoluble solids, and the centrifuged solution was used in producing the compositions of Table XVIII.

The SDI value tended to increase with increasing ratio of the weight of the oily liquid (i.e. acetochlor plus ISOPAR M) containing the oil phase to the weight of the aqueous phase.

TABLE XVIII

| | Weight % | | |
|---|---|---|---|
| Ingredient | Comp. No. 13-1 | Comp. No. 13-2 | Comp. No. 13-3 |
| Acetochlor (95.8% Active) | 64.85 | 63.81 | 57.30 |
| Aqueous Solution of Sodium-salt of Fomesafen | 25.88 | 25.47 | 23.00 |
| Sodium Dioctyl Sulfosuccinate (Surfactant) | 6.49 | 7.51 | 9.10 |
| ISOPAR M | 2.78 | 3.22 | 3.90 |
| Hexylene glycol (Dielectricity modifier) | — | — | 6.50 |

TABLE XVIII-continued

| Ingredient | Weight % | | |
|---|---|---|---|
| | Comp. No. 13-1 | Comp. No. 13-2 | Comp. No. 13-3 |
| Surfactant Demand Index (SDI) | 0.2508 | 0.2949 | 0.3957 |
| Weight-ratio of the surfactant and dielectricity-modifier liquid-free total oil phase (i.e., acetochlor plus ISOPAR M) and the Aqueous fomesafen Solution | 2.613 | 2.632 | 2.661 |

TABLE XIX

| Ingredient | Weight % |
|---|---|
| Fomesafen (97.8% Active) | 56.87 |
| 21% Sodium Hydroxide Solution | 24.69 |

TABLE XIX-continued

| Ingredient | Weight % |
|---|---|
| Deionized Water | 18.30 |
| Preservative | 0.13 |

Example 14

Non-water-continuous herbicidal microemulsion compositions were prepared in accordance with the General Formulation Procedure. Details of the compositions are presented in Table XX. This example shows a non-water-continuous, herbicidal microemulsion composition where the amount of the aqueous phase is greater than 50% by weight. The composition of the aqueous salt solution of dicamba and fomesafen is given in Table XXL. These compositions were stable over the course of 24 hours at a temperature of 54° C.

TABLE XX

| Ingredient | Weight % | | | | |
|---|---|---|---|---|---|
| | Comp. No. 14-1 | Comp. No. 14-2 | Comp. No. 14-3 | Comp. No. 14-4 | Comp. No. 14-5 |
| Acetochlor (96.1%) | 28.68 | 26.22 | 30.32 | | |
| Aromatic 200 | | | | 17.85 | 13.76 |
| Safener Mixture | 5.02 | 4.59 | 5.31 | | |
| STEPFAC 8182 | 12.50 | 12.50 | 7.50 | 10.00 | |
| Sodium Dihexyl Sulfosuccinate | | | | | 11.97 |
| Nonionic Surfactant Blend (Same as in Example 5) | | | | | 0.50 |
| 2-Ethyl 1-hexanol | | 7.50 | | 5.00 | 13.76 |
| Aqueous Salt Solution of Dicamba and Fomesafen | | | | 67.50 (2) | 60.00 (3) |
| Aqueous Salt Solution of Dicamba | 53.80 (1) | 49.19 (1) | 56.88 (1) | | |

(1): Aqueous salt Solution of Dicamba is specified in Table XXI.
(2): Aqueous Salt Solution of Dicamba and Fomesafen are specified in Table XXI.

TABLE XXI

| | Ingredient, Weight % | | | | | | |
|---|---|---|---|---|---|---|---|
| Aqueous Phase Solution | Dicamba Solid, 98.3% Active | Fomesafen Solid, 98.5% Active | DI Water | 50 Wt. % NaOH | MEA | Alkylene Glycol | Cationic Guar Gum |
| 1 (referred to in Table XX): Partially-neutralized Sodium salt of Dicamba (Degree of neutralization: about 50%) dissolved in a mixture of water and propylene glycol | 45.57 | | 8.22 | 8.11 | | 38.09 | 0.014 |
| 2 (referred to in Table XX): Aqueous Salt Solution of MEA-Dicamba and Sodium Fomesafen dissolved in a mixture of water and hexylene glycol | 40.79 | 20.35 | 15.24 | 3.69 | 11.12 | 8.81 | |

Example 15

Non-water-continuous herbicidal microemulsion compositions were prepared in accordance with the General Formulation Procedure. The oil phase contained a mixture of an oily herbicide, acetochlor, and an oil-dissolvable herbicide, metribuzin, and the aqueous phase contained an aqueous solution of a salt of a weak-acid, ionic herbicide, dicamba. The composition of the metribuzin solution (dissolved in acetochlor) is provided in Table XXIII. The metribuzin solution was stored overnight to allow a small amount of insoluble solids to settle, after which the insoluble solid-free portion of the solution was decanted. The decanted solution was used in producing the compositions of Table XXII.

The composition of the dicamba salt solution added as the aqueous phase is given by #2 in Table XII. The anionic surfactant added to the compositions was an alkyl ether phosphate ester, namely, aliphatic C10 ethoxylate phosphate mono-ester in acid form (MAPHOS A, available from BASF). The nonionic surfactant added was a blend containing an ethylene oxide-propylene oxide block copolymer surfactant (commercially available from Stepan Company as Stepan Agent 1690 92N). The compositions also contained the safener mix as described in Example 5 and 2-ethyl hexanol as the dielectricity modifier. The SDI was calculated as described in Example 9.

TABLE XXII

| Comp. No. | SDI | Metribuzin-Acetochlor Mix | Safener Mix | 50 Wt. % NaOH | Anionic Surfactant | Nonionic Surfactant | Dicamba Salt Solution | DI Water | 2-Ethyl hexanol |
|---|---|---|---|---|---|---|---|---|---|
| 15-1 | 0.534 | 44.97 | 6.06 | 1.35 | 12.00 | 1.00 | 19.51 | 2.60 | 12.50 |
| 15-2 | 0.503 | 44.97 | 6.06 | 1.85 | 11.50 | 1.00 | 19.51 | 2.60 | 12.50 |
| 15-3 | 0.445 | 46.41 | 6.26 | 1.10 | 10.00 | 1.00 | 20.13 | 2.60 | 12.50 |

TABLE XXIII

| Ingredient | Weight % |
|---|---|
| Metribuzin (97% Active) | 13.32 |
| Acetochlor (96.1% Active) | 86.68 |

Example 16

Non-water-continuous herbicidal microemulsion compositions were prepared in accordance with the General Formulation Procedure. The oil phase contained acetochlor and the aqueous phase contained a weak-acid herbicide, dicamba. The compositions of the dicamba salt solutions contained in these compositions are given in Table XXV. The primary stabilizing (anionic) surfactant was an ethoxylated phosphate ester surfactant selected from either: (1) STEPFAC 8182 from Stepan Company with an average number of moles of ethylene oxide (EO) group of 12, and a monoester content of about 45% by weight and a diester content of about 37% by weight; and (2) PHOSPHOLAN PS-131 with an average number of moles of ethylene oxide (EO) group of 6, and a monoester content of about 70% by weight. The compositions also contained a nonionic surfactant blend containing an ethylene oxide-propylene oxide block copolymer surfactant (commercially available from Stepan Company as Stepan Agent 1690 92N) and the safener mix described in Example 5.

TABLE XXIV

| Comp. No. | Acetochlor (96.1% Active) | Safener Mix | Acid for pH-adjustment | 50 Wt. % NaOH | Anionic Surfactant | Nonionic Surfactant | Dicamba Salt Solution | DI Water | Dielectricity Modifier |
|---|---|---|---|---|---|---|---|---|---|
| 16-1 | 41.35 | 7.33 | 1.75 (6) | | 12.50 (1) | | 23.57 (9) | 6.00 | 7.5 (4) |
| 16-2 | 41.35 | 7.33 | 1.75 (6) | | 10.00 (1) | 2.50 | 23.57 (9) | 6.00 | 7.5 (4) |
| 16-3 | 41.49 | 7.35 | 7.50 (7) | | 10.00 (1) | 2.50 | 23.66 (9) | | 7.5 (4) |
| 16-4 | 42.92 | 7.61 | 5.00 (7) | | 10.00 (1) | 2.50 | 24.47 (9) | | 7.5 (4) |
| 16-5 | 41.37 | 7.24 | | 1.00 | 12.00 (1) | 2.00 | 36.40 (9) | | |
| 16-6 | 36.50 | 6.39 | | 1.00 | 12.00 (1) | 2.00 | 32.11 (9) | | 10.00 (5) |
| 16-7 | 31.63 | 5.54 | | 1.00 | 12.00 (1) | 2.00 | 27.83 (9) | | 20.00 (5) |
| 16-8 | 23.19 | 4.06 | 0.90 (6) | | 12.00 (1) | 2.00 | 27.85 (10) | | 30.00 (4) |
| 16-9 | 45.29 | 7.93 | | | 7.50 (2) | 5.00 | 26.78 (11) | | 7.50 (4) |
| 16-10 | 42.30 | 7.40 | | | 7.50 (2) | 5.00 | 30.29 (12) | | 7.50 (4) |
| 16-11 | 39.60 | 6.93 | | | 7.50 (2) | 5.00 | 33.47 (13) | | 7.50 (4) |
| 16-12 | 37.56 | 6.57 | | | 7.50 (2) | 5.00 | 35.87 (14) | | 7.50 (4) |

(1): STEPFAC 8182;
(2): PHOSPHOLAN PS-131;
(4): 2-Ethylhexanol;
(5): Hexylene Glycol;
(6): Orthophosphoric Acid;
(7): Glacial acetic acid;
(9), (10), (11), (12), (13), (14): Dicamba salt solutions are specified in Table XXV.

TABLE XXV

| | Ingredient, Weight % | | | | | |
|---|---|---|---|---|---|---|
| Dicamba Salt Solution | Dicamba Solid, 98.3% Active | DI Water | 50 Wt. % NaOH | Alkylene Glycol | Glacial Acetic Acid | Glycerin |
| 9 (referred to in Table XXIV): Partially-neutralized Sodium salt of Dicamba (Degree of neutralization: about 61%) dissolved in a mixture of water and propylene glycol | 48.86 | 20.25 | 10.60 | 20.29 | | |
| 10 (referred to in Table XXIV): Sodium salt of Dicamba dissolved in water | 35.65 | 51.67 | 12.68 | | | |

TABLE XXV-continued

| Dicamba Salt Solution | Ingredient, Weight % | | | | | |
|---|---|---|---|---|---|---|
| | Dicamba Solid, 98.3% Active | DI Water | 50 Wt. % NaOH | Alkylene Glycol | Glacial Acetic Acid | Glycerin |
| 11 (referred to in Table XXIV): Partially-neutralized Sodium salt of Dicamba (Degree of neutralization: about 33.5%) dissolved in a mixture of water and hexylene glycol | 47.02 | 12.48 | 5.61 | 34.89 | | |
| 12 (referred to in Table XXIV): Partially-neutralized Sodium salt of Dicamba (Degree of neutralization: about 61%) dissolved in a mixture of water and hexylene glycol | 38.81 | 23.99 | 8.42 | 28.78 | | |
| 13 (referred to in Table XXIV): Partially-neutralized Sodium salt of Dicamba (Degree of neutralization: about 61%) dissolved in a mixture of water, hexylene glycol, and glacial acetic acid | 32.89 | 12.58 | 7.14 | 32.01 | 15.38 | |
| 14 (referred to in Table XXIV): Partially-neutralized Sodium salt of Dicamba (Degree of neutralization: about 61%) dissolved in a mixture of water, hexylene glycol, glacial acetic acid, and glycerin | 29.11 | 17.98 | 6.32 | 21.59 | 13.50 | 11.50 |

Surprisingly, the partially-neutralized dicamba salt solutions in Table XXV appeared to have a brown colored (characteristic of a dicamba salt solution), oily, water-immiscible liquid, when diluted substantially with water, despite that dicamba is a solid material, and that the alkylene glycols, glacial acetic acid, and glycerin noted in Table XXV are all miscible with water and are colorless. This finding suggests the possibility that a portion of the dicamba solution microemulsified in an oil phase could remain entrapped within the oil droplets of the oil-in-water macroemulsion, which are produced when the microemulsion is diluted with water for herbicide application.

Without limiting to any specific theory, a plausible explanation for the above finding is noted below. The un-neutralized or acidic dicamba molecules are sparingly soluble (i.e. less than 1% by weight) in water, but are highly soluble (i.e. about 50-60% by weight) in a glycol such as propylene glycol and hexylene glycol. Relatively high amounts (e.g., about 45% by weight of the solution) of acidic dicamba molecules can be dissolved in mixtures of a water-miscible glycol and water with a substantial amount (e.g., 30% or higher by weight of the mixture) of the glycol contained therein. Presumably, the acidic dicamba molecules can form a hydrogen-bonded complex with the glycol molecules and thus can be solubilized in pure glycol or in an aqueous solution with a glycol as a co-solvent.

Example 17

Non-water-continuous herbicidal microemulsion compositions were prepared in accordance with the General Formulation Procedure. Details of the compositions are presented in Table XXVI. The oil phase contained an oily herbicide, acetochlor, and the aqueous phase contained a dicamba salt solution. The compositions of the dicamba salt solutions contained in these compositions are given in Table XXVII. The primary stabilizing surfactant was an ethoxylated phosphate ester surfactant, STEPFAC 8182, as described in Example 16. A cationic surfactant selected from: (1) a water-soluble cationic surfactant, ARQUAD T-50 (50 wt. % active) from AkzoNobel; and (2) an oil-soluble cationic surfactant, ARQUAD 2C-75 (75 wt. % active) from AkzoNobel was also added. ARQUAD T-50 is a quaternary ammonium compound with a tallow alkyl chain, and ARQUAD 2C-75 is a dialkyl (dicoco) quaternary ammonium compound. The compositions also contain a nonionic surfactant blend containing an ethylene oxide-propylene oxide block copolymer surfactant (commercially available from Stepan Company as Stepan Agent 1690 92N) and the safener mix as described in Example 5.

The cationic surfactant was added to effectively reduce the anionic surface charge (due to the anionic surfactant used as the primary stabilizing surfactant for the non-water-continuous microemulsions) of the herbicide oil droplets in oil-in-water macroemulsions, which are produced when the herbicidal microemulsion compositions are diluted with water for herbicide application, for example, as herbicidal spray emulsions.

TABLE XXVI

| | Ingredient, Weight % | | | | | | | | |
|---|---|---|---|---|---|---|---|---|---|
| Comp. No. | Acetochlor (96.1% Active) | Safener Mix | Acid or Base for pH-adjustment | Cationic Surfactant | Anionic Surfactant | Nonionic Surfactant | Dicamba Salt Solution | DI Water | Dielectricity Modifier |
| 17-1 | 39.12 | 6.93 | 1.00 (6) | 7.50 (1) | 10.00 | 2.50 | 22.30 (10) | 3.15 | 7.5 (4) |
| 17-2 | 41.09 | 7.28 | 1.00 (6) | 5.00 (2) | 10.00 | 2.50 | 23.43 (10) | 2.00 | 7.5 (4) |
| 17-3 | 38.63 | 6.85 | 5.00 (7) | 7.50 (1) | 10.00 | 2.50 | 22.02 (10 | | 7.5 (4) |
| 17-4 | 40.06 | 7.10 | 5.00 (7) | 5.00 (2) | 10.00 | 2.50 | 22.84 (10) | | 7.5 (4) |
| 17-5 | 38.63 | 6.85 | 5.00 (7) | 7.50 (1) | 7.50 | 5.00 | 22.02 (10) | | 7.5 (4) |

TABLE XXVI-continued

| | | | | Ingredient, Weight % | | | | | |
|---|---|---|---|---|---|---|---|---|---|
| Comp. No. | Acetochlor (96.1% Active) | Safener Mix | Acid or Base for pH- adjustment | Cationic Surfactant | Anionic Surfactant | Nonionic Surfactant | Dicamba Salt Solution | DI Water | Dielectricity Modifier |
| 17-6 | 40.06 | 7.10 | 5.00 (7) | 5.00 (2) | 7.50 | 5.00 | 22.84 (10) | | 7.5 (4) |
| 17-7 | 40.06 | 7.10 | 5.00 (7) | 7.50 (1) | 6.00 | 4.00 | 22.84 (10) | | 7.5 (4) |
| 17-8 | 41.49 | 7.35 | 5.00 (7) | 5.00 (2) | 6.00 | 4.00 | 23.66 (10) | | 7.5 (4) |
| 17-9 | 37.20 | 6.59 | 5.00 (7) | 10.00 (2) | 7.50 | 5.00 | 21.21 (10) | | 7.50 (4) |
| 17-10 | 35.77 | 6.34 | 5.00 (7) | 5.00 (2) | 10.00 | 2.50 | 20.39 (10) | | 15.00 (5) |
| 17-11 | 43.31 | 7.58 | | 2.00 (1) | 7.00 | 2.00 | 38.81 (11) | | |
| 17-12 | 38.45 | 6.73 | | 2.00 (1) | 7.00 | 2.00 | 35.87 (11) | | 10.00 (4) |
| 17-13 | 38.45 | 6.73 | | 2.00 (1) | 7.00 | 2.00 | 35.87 (11) | | 10.00 (5) |
| 17-14 | 43.03 | 7.53 | 0.58 (8) | 2.00 (1) | 7.00 | 2.00 | 37.86 (11) | | |
| 17-15 | 38.16 | 6.68 | 0.58 (8) | 2.00 (1) | 7.00 | 2.00 | 33.58 (11) | | 10.00 (4) |
| 17-16 | 38.16 | 6.68 | 0.58 (8) | 2.00 (1) | 7.00 | 2.00 | 33.58 (11) | | 10.00 (5) |

(1): Arquad T-50;
(2): Arquad 2C-75;
(4): 2-Ethylhexanol;
(5): Hexylene Glycol;
(6): Orthophosphoric Acid;
(7): Glacial acetic acid;
(8): 50 wt % sodium hydroxide solution;
(10), (11): Dicamba salt solutions are specified in Table XXVII.

TABLE XXVII

| | Ingredient, Weight % | | | |
|---|---|---|---|---|
| Dicamba Salt Solution | Dicamba Solid, 98.3% Active | DI Water | 50 Wt. % Sodium Hy- droxide | Pro- pylene Glycol |
| 10 (referred to in Table XXVI): Partially-neutralized Sodium salt of dicamba (Degree of neutralization: about 61%) dissolved in a mixture of water and propylene glycol | 48.86 | 20.25 | 10.60 | 20.29 |
| 11 (referred to in Table XXVI): Partially-neutralized Sodium salt of dicamba (Degree of neutralization: about 61%) dissolved in a mixture of water and propylene glycol | 48.58 | 20.71 | 10.54 | 20.17 |

In weed control efficacy testing involving Compositions 17-3 through 17-9 and Compositions 16-1 and 16-2 and a broadleaf weed (Velvetleaf), Compositions 17-5, 17-7, and 17-8 showed a superior performance, as compared to a tank mix of acetochlor and dicamba with respective commercial products. The extent of weed control was about 30-40% higher for these compositions after an extended period of time following application of the herbicides, and about 47-63% higher at a later time.

Example 18

Non-water-continuous herbicidal microemulsion compositions were prepared in accordance with the General Formulation Procedure. Details of the compositions are presented in Table XXVIII. The oil phase contained an oily herbicide, acetochlor, and the aqueous phase contained a dicamba salt solution. The compositions of the dicamba salt solutions contained in these compositions are given in Table XXIX. The primary stabilizing surfactant was an ethoxylated phosphate ester surfactant, STEPFAC 8182, as described in Example 16. The compositions also include a cationically-modified, polysaccharide polymer, guar gum. This ingredient was added to cause weak-flocculation of the herbicide oil droplets when the compositions are diluted with water and form oil-in-water macroemulsions for use as herbicidal spray emulsions. The compositions also contained a nonionic surfactant blend containing an ethylene oxide-propylene oxide block copolymer surfactant (commercially available from Stepan Company as Stepan Agent 1690 92N) and the safener mix as described in Example 5.

Composition 18-5 failed to form a microemulsion. All compositions in Table XXVIII, except for Composition 18-22 which does not contain the cationic polymer, show rapid and extensive weak-flocculation of the oil droplets in the oil-in-water macroemulsion, which were produced when the microemulsion compositions was diluted with water. The flocculated droplets repeptized easily even under slight agitation.

TABLE XXVIII

| | Ingredient, Weight % | | | | | | | |
|---|---|---|---|---|---|---|---|---|
| | Acetochlor | | | | | Dicamba | Dielectricity Modifier | |
| Comp. No. | (96.1% Active) | Safener Mix | 50 Wt % NaOH | Anionic Surfactant | Nonionic Surfactant | Salt Solution | Hexylene glycol | 2-Ethyl- hexanol |
| 18-1 | 41.00 | 7.17 | 1.00 | 12.00 | 2.00 | 36.83 (5) | | |
| 18-2 | 36.17 | 6.33 | 1.00 | 12.00 | 2.00 | 32.49 (5) | 10.00 | |

TABLE XXVIII-continued

| | Acetochlor | | | | | Dicamba | Dielectricity Modifier | |
|---|---|---|---|---|---|---|---|---|
| Comp. No. | (96.1% Active) | Safener Mix | 50 Wt % NaOH | Anionic Surfactant | Nonionic Surfactant | Salt Solution | Hexylene glycol | 2-Ethyl-hexanol |
| 18-3 | 31.35 | 5.49 | 1.00 | 12.00 | 2.00 | 28.16 (5) | 20.00 | |
| 18-4 | 32.40 | 5.67 | 0.83 | 10.00 | 2.00 | 29.10 (5) | 20.00 | |
| 18-5 | 43.13 | 7.55 | 0.58 | 8.00 | 2.00 | 38.74 (5) | | |
| 18-6 | 38.31 | 6.70 | 0.58 | 8.00 | 2.00 | 34.41 (5) | 10.00 | |
| 18-7 | 38.31 | 6.70 | 0.58 | 8.00 | 2.00 | 34.41 (5) | | 10.00 |
| 18-8 | 35.89 | 6.28 | 0.58 | 8.00 | 2.00 | 32.24 (5) | 5.00 | 10.00 |
| 18-9 | 35.62 | 6.23 | 1.16 | 8.00 | 2.00 | 31.99 (5) | 5.00 | 10.00 |
| 18-10 | 33.20 | 5.81 | 1.16 | 8.00 | 2.00 | 29.83 (5) | 5.00 | 15.00 |
| 18-11 | 35.21 | 6.16 | 2.00 | 8.00 | 2.00 | 31.63 (5) | 5.00 | 10.00 |
| 18-12 | 34.13 | 5.97 | 1.74 | 8.00 | 2.00 | 30.66 (5) | 2.50 | 15.00 |
| 18-13 | 38.19 | 6.68 | 1.16 | 8.00 | 2.00 | 33.96 (6) | | 10.00 |
| 18-14 | 35.49 | 6.21 | 1.74 | 8.00 | 2.00 | 31.56 (6) | | 15.00 |
| 18-15 | 34.93 | 6.11 | | 12.50 | | 38.45 (7) | | 8.00 |
| 18-16 | 42.02 | 7.35 | | 12.50 | | 23.13 (7) | | 15.00 |
| 18-17 | 42.02 | 7.35 | | 12.50 | | 23.13 (7) | 7.00 | 8.00 |
| 18-18 | 42.21 | 7.39 | | 12.50 | | 22.90 (8) | 7.00 | 8.00 |
| 18-19 | 34.21 | 5.99 | | 12.50 | | 33.80 (9) | 5.50 | 8.00 |
| 18-20 | 34.30 | 6.00 | | 12.50 | | 33.70 (10) | 5.50 | 8.00 |
| 18-21 | 44.41 | 7.77 | | 12.50 | | 21.82 (10) | 5.50 | 8.00 |
| 18-22 | 35.46 | 6.21 | | 12.50 | | 37.83 (11) | | 8.00 |

(5), (6), (7), (8), (9), (10), (11): Dicamba salt solutions are specified in Table XXIX.

TABLE XXIX

| | Ingredient, Weight % | | | | |
|---|---|---|---|---|---|
| Dicamba Salt Solution | Dicamba Solid, 98.3% Active | DI Water | 50 Wt % NaOH | Propylene Glycol | Cationic Guar Gum |
| 5 (referred to in Table XXVIII): Partially-neutralized Sodium salt of Dicamba (Degree of neutralization: about 61%) dissolved in a mixture of water and propylene glycol | 47.59 | 22.247 | 10.33 | 19.76 | 0.073 |
| 6 (referred to in Table XXVIII): Partially-neutralized Sodium salt of Dicamba (Degree of neutralization: about 61%) dissolved in a mixture of water and propylene glycol | 48.07 | 21.489 | 10.43 | 19.96 | 0.051 |
| 7 (referred to in Table XXVIII): Partially-neutralized Sodium salt of Dicamba (Degree of neutralization: about 50%) dissolved in a mixture of water and propylene glycol | 40.40 | 30.81 | 7.19 | 21.50 | 0.100 |
| 8 (referred to in Table XXVIII): Partially-neutralized Sodium salt of Dicamba (Degree of neutralization: about 50%) dissolved in a mixture of water and propylene glycol | 40.97 | 29.884 | 7.29 | 21.80 | 0.056 |
| 9 (referred to in Table XXVIII): Partially-neutralized Sodium salt of Dicamba (Degree of neutralization: about 50%) dissolved in a mixture of water and propylene glycol | 45.00 | 16.935 | 7.97 | 30.04 | 0.055 |
| 10 (referred to in Table XXVIII): Partially-neutralized Sodium salt of Dicamba (Degree of neutralization: about 50%) dissolved in a mixture of water and propylene glycol | 45.25 | 16.492 | 8.02 | 30.20 | 0.038 |
| 11 (referred to in Table XXVIII): Partially-neutralized Sodium salt of Dicamba (Degree of neutralization: about 50%) dissolved in a mixture of water and propylene glycol | 41.68 | 28.72 | 7.42 | 22.18 | |

Example 19

This example demonstrates a method for improving the chemical stability of non-water-continuous herbicidal microemulsion compositions that contain acetochlor (a lipophilic component) and dicamba (a weak-acid, ionic herbicide) as the herbicidal active ingredients by lowering the pH of the compositions. Non-water-continuous herbicidal microemulsion compositions were prepared in accordance with the General Formulation Procedure. Details of the compositions are presented in Table XXX. The compositions of the dicamba solutions contained in these compositions are given in Table XXXI. The pH of the microemulsion compositions was adjusted to a strongly acidic pH of less than 5. Subsequently, these compositions were tested for chemical stability by incubating samples of the microemulsion compositions at 40° C. for 6 weeks. The weight % recovery of acetochlor after the testing period was used as a measure of chemical stability. The weight % recovery of acetochlor is equal to the final or residual amount (i.e., weight % after stability-testing) of acetochlor divided by the initial amount (i.e., weight % prior to stability-testing) of acetochlor for a given composition multiplied by 100%. The higher the weight % recovery of acetochlor, the higher the chemical stability.

Since the microemulsion compositions have a microstructure that is non-water-continuous, the pH measured for these microemulsion compositions is referred to herein as "Indicator pH". The Indicator pH of the microemulsion compositions is measured as follows: The pH-probe of a suitably calibrated pH-meter is inserted into a sample, and the pH is recorded after an elapsed time of 6 minutes. Typically, the Indicator pH is from about 1 to about 2 pH-units higher than the pH of a water-continuous emulsion that is obtained after diluting the non-water-continuous microemulsion with deionized water by a factor of from about 5 to about 10 times the weight of the microemulsion.

Example 20

This example demonstrates another method for improving the chemical stability of non-water-continuous herbicidal microemulsion compositions that contain acetochlor and dicamba as the herbicidal active ingredients by mixing the acetochlor with an oil-miscible dielectricity modifier as described herein. Non-water-continuous herbicidal microemulsion compositions were prepared in accordance with the General Formulation Procedure. Details of the compositions are presented in Table XXXII. Notably, the dielectricity modifier in Comp. No. 2 is an aromatic hydrocarbon (napthelenic), Aromatic 200. On the other hand, the dielectricity modifier in Comp. No. 3 and 4, respectively, comprise a mixture of a branched alcohol (2-ethyl-1-hexanol) and an aliphatic hydrocarbon (NORPAR 15), and a mixture of a linear alcohol (oleyl alcohol) and an aliphatic hydrocarbon. Octocryelene, a polar ester is the dielectricity modifier in Comp. No. 5. The compositions of the dicamba solutions contained in these compositions are given in Table XXXIII Two different bases, a 50 wt. % solution of sodium hydroxide and an ethoxylated fatty amine (Ethomeen C-15), were used in partially neutralizing dicamba, meaning that the dicamba salt solution comprised a mixture of sodium salt and an amine salt of dicamba.

These compositions were tested for chemical stability by incubating samples of the microemulsion compositions at 40° C. for 8 weeks. The weight % recovery of acetochlor after the testing period was used as a measure of chemical stability. Comp. No. 2-5 (with dielectricity modifier) exhibited greater weight % recovery of acetochlor after incubation of the microemulsion samples at 40° C. for 8 weeks as compared to Comp. No. 1 (without any dielectricity modifier).

TABLE XXX

| Chemical Stability: Wt. % Recovery of Acetochlor (40° C.-6 Wks.) | Indicator pH | Wt. % of Dielectricity Modifier (2-Ethyl Hexanol) | Wt. % of Acetochlor (96.1%) | Wt. % of Safener | Wt. % of Dicamba Solution | Wt. % of Surfactant (95% Active): Ethoxylated Phosphate Ester in Acid Form | Wt. % of 50% NaOH |
|---|---|---|---|---|---|---|---|
| 89 | 6.1 | 31.95 | 27.14 | 4.81 | 18.76[1] | 13.54 | 3.8 |
| 91.7 | 5.6 | 32.34 | 27.47 | 4.87 | 18.98[1] | 13.54 | 2.8 |
| 93.6 | 5.1 | 32.61 | 27.7 | 4.91 | 19.14[1] | 13.54 | 2.1 |
| 91.2 | 6.2 | 30.63 | 26.02 | 4.61 | 20.70[2] | 13.54 | 4.5 |
| 91.7 | 5.8 | 30.89 | 26.24 | 4.65 | 20.88[2] | 13.54 | 3.8 |
| 94.1 | 5.3 | 31.27 | 26.56 | 4.71 | 21.13[2] | 13.54 | 2.8 |
| 95.7 | 5 | 31.53 | 26.78 | 4.75 | 21.30[2] | 13.54 | 2.1 |
| 96.4 | 4.8 | 31.64 | 26.87 | 4.76 | 21.38[2] | 13.54 | 1.8 |

TABLE XXXI

| Dicamba Salt Solution | Ingredient, Weight % | | |
|---|---|---|---|
| | Dicamba Solid, 98.3% Active | Deionized Water | 45% Wt. % Potassium Hydroxide or 50 Wt. % Sodium Hydroxide |
| 1: Potassium salt of Dicamba | 40.32 | 37.33 | 22.34 |
| 2: Sodium salt of Dicamba | 35.0 | 52.49 | 12.51 |

TABLE XXXII

| Comp. No. | Chemical Stability: Wt. % Recovery of Acetochlor (40° C.-8 Wks.) | Indicator pH | Wt. % of Dielectricity Modifier (DM) | | Wt. % of Acetochlor Tech (96.1%) | Wt. % of Dicamba Solution | Wt. % of Surfactant (95% Active): Ethoxylated Phosphate Ester in Acid Form | Wt. % of Ortho-phosphoric Acid |
|---|---|---|---|---|---|---|---|---|
| | | | DM 1 | DM 2 | | | | |
| 1 | 94.86 | 4.19 | 0.0 | 0.0 | 54.57 | 30.93 | 14.0 | 0.50 |
| 2 | 97.04 | 4.25 | 24.0 Aromatic 200 | 0.0 | 39.45 | 22.35 | 14.0 | 0.20 |

TABLE XXXII-continued

| Comp. No. | Chemical Stability: Wt. % Recovery of Acetochlor (40° C.-8 Wks.) | Indicator pH | Wt. % of Dielectricity Modifier (DM) DM 1 | DM 2 | Wt. % of Acetochlor Tech (96.1%) | Wt. % of Dicamba Solution | Wt. % of Surfactant (95% Active): Ethoxylated Phosphate Ester in Acid Form | Wt. % of Ortho-phosphoric Acid |
|---|---|---|---|---|---|---|---|---|
| 3 | 96.47 | 4.27 | 17.50 2-Ethyl Hexanol | 6.50 Norpar 15 | 39.49 | 22.38 | 14.0 | 0.13 |
| 4 | 95.94 | 4.1 | 17.50 Oleyl Alcohol | 6.50 Norpar 15 | 39.49 | 22.38 | 14.0 | 0.13 |
| 5 | 96.17 | 4.2 | 24.0 Octocrylene | 0.0 | 39.45 | 22.35 | 14.0 | 0.20 |

TABLE XXXIII

| | Ingredient, Weight % | | | | |
|---|---|---|---|---|---|
| Dicamba Salt Solution | Dicamba Solid, 98.3% Active | Deionized Water | 50 Wt. % NaOH | Ethomeen C-15 | Propylene Glycol |
| Sodium + Amine salt of Dicamba | 37.64 | 19.07 | 3.57 | 24.09 | 15.63 | propylene glycol to dicamba of about 1.23. The pH of the microemulsion compositions was also decreased to about 4.3 or below.

These compositions were tested for chemical stability by incubating samples of the microemulsion compositions at 40° C. for 8 weeks. The weight % recovery of acetochlor after the testing period was used as a measure of chemical stability. The results show that addition of a diol, a lower acidic Indicator pH of the microemulsion, and a higher amount of dielectricity modifier results in a greater chemical stability. Notably, the glycol-free composition contained the highest amount of dielectricity modifier, among all the compositions in Table XXXIV.

TABLE XXXIV

| Chemical Stability: Wt. % Acetochlor-recovery (40° C.-8 Wks.) | Indicator pH | Wt. % of Dielectricity Modifier (2-Ethyl Hexanol) | Wt. % of Acetochlor (96.1%) | Wt. % of Safener | Wt. % of Dicamba Solution | Wt. % of Surfactant (95% Active): Ethoxylated Phosphate Ester in Acid Form | Wt. % of 50% Sodium Hydroxide, Diluent-water |
|---|---|---|---|---|---|---|---|
| 98.4 | 4.3 | 15.0 | 38.41 | 6.81 | 21.90[1] | 13.54 | 1.85, 2.50 |
| 100 | 3.9 | 15.0 | 38.75 | 6.87 | 22.09[1] | 13.54 | 1.25, 2.50 |
| 99.2 | 3.9 | 7.5 | 43.10 | 7.64 | 24.57[1] | 13.54 | 1.15, 2.50 |
| 100 | 3.7 | 7.5 | 43.30 | 7.67 | 24.72[1] | 13.54 | 0.8, 2.50 |
| 98.8 (glycol-free) | 3.9 | 30 | 28.56 | 5.06 | 22.33[2] | 13.54 | 0.5, 0.0 |

Example 21

This example demonstrates another method for improving the chemical stability of non-water-continuous herbicidal microemulsion compositions that contain acetochlor and dicamba as the herbicidal active ingredients by including a diol, such as propylene glycol, in the dicamba salt solution used in preparing non-water-continuous microemulsion compositions. Non-water-continuous herbicidal microemulsion compositions were prepared in accordance with the General Formulation Procedure. Details of the compositions are presented in Table XXXII. The compositions of the dicamba salt solutions used in preparing the microemulsion compositions are given in Table XXXV. Propylene glycol was added to the dicamba salt solution in a molar ratio of

TABLE XXXV

| | Ingredient, Weight % | | | |
|---|---|---|---|---|
| Dicamba Salt Solution | Dicamba Solid, 98.3% Active | Deionized Water | 50 Wt. % Sodium Hydroxide | Propylene Glycol |
| Sodium salt of Dicamba (61% Neutralization of Dicamba) | 48.83 | 20.3 | 10.60 | 20.27 |
| Sodium salt of Dicamba (100% Neutralization of Dicamba) | 35.65 | 51.67 | 12.68 | 0.0 |

Example 22

This example further demonstrates the beneficial effect of adding a diol, such as propylene glycol, on chemical stability of non-water-continuous microemulsion compositions containing acetochlor and dicamba. Non-water-continuous herbicidal microemulsion compositions were prepared in accordance with the General Formulation Procedure. Details of the compositions are presented in Table XXXVI. The compositions of the dicamba salt solutions used in preparing the microemulsion compositions are given in Table XXXVII. The glycol-to-water (including the water of neutralization and the water added with the sodium hydroxide solution) ratio was held constant at 42:58 for the dicamba solutions. Propylene glycol was added to the dicamba salt solution a molar ratio of propylene glycol to dicamba of 2.5 to 4. The pH of the microemulsion compositions was also decreased to below 4.

These compositions were tested for chemical stability by incubating samples of the microemulsion compositions at 54° C. for 2 weeks. The weight % recovery of acetochlor after the testing period was used as a measure of chemical stability. The results show that addition of a diol and a lower acidic Indicator pH of the microemulsion results in high chemical stability.

The diluted compositions were subjected to dicamba volatility testing by the procedure described in "A Method to Determine the Relative Volatility of Auxin Herbicide Formulations" in ASTM publication STP1587 entitled "Pesticide Formulation and Delivery Systems: 35th Volume, Pesticide Formulations, Adjuvants, and Spray Characterization in 2014, published 2016, which is incorporated herein by reference. The general procedure is described briefly below.

Humidomes obtained from Hummert International (Part Nos 14-3850-2 for humidomes and 11-3050-1 for 1020 flat tray) were modified by cutting a 2.2 cm diameter hole on one end approximately 5 cm from the top to allow for insertion of a glass air sampling tube (22 mm OD) containing a polyurethane foam (PUF) filter. The sampling tube was secured with a VITON o-ring on each side of the humidome wall. The air sampling tube external to the humidome was fitted with tubing that was connected to a vacuum manifold immediately prior to sampling. The flat tray beneath the humidome was filled with 1 liter of sifted dry or wet 50/50 soil (50% Redi-Earth and 50% US 10 Field Soil) to a depth of about 1 cm. A track sprayer was used to apply the compositions at a dicamba application rate of 1.0 lb/A a.e. at 10 gallons per acre (GPA) onto the soil of each humidome.

The flat tray bottom containing the auxin herbicide formulation on soil was covered with the humidome lid and the lid was secured with clamps. The growth chambers were set at 35° C. and 40% relative humidity (RH). The assembled humidomes were placed in a temperature and humidity controlled environment and connected to a vacuum manifold through the air sampling line. Air was drawn through the humidome and PUF at a rate of 2 liters per minute (LPM) for 24 hours at which point the air sampling was stopped. The humidomes were then removed from the controlled environment and the PUF filter was removed. The PUF filter was extracted with 20 mL of methanol and the solution was analyzed for the auxin herbicide concentration using LC-MS methods known in the art.

The results of the volatility tests are shown in Table XXXVIII below. The results are presented as a percent volatility reduction relative to Comp. No. 4-1. The results show a significant reduction of volatility with an increasing amount of propylene glycol.

TABLE XXXVI

| Comp. No. | Chemical Stability: Wt. % Acetochlor-recovery (54° C. - 2 Wks.) | pH | Glycol-to-Dicamba Molar Ratio | Wt. % of Dielectricity Modifier (2-Ethyl Hexanol) | Wt. % of Acetochlor (96.1%) | Wt. % of Dicamba Solution | Wt. % of Surfactant (82% Active): Ethoxylated Phosphate Ester in Acid Form | Wt. % of Phosphoric Acid |
|---|---|---|---|---|---|---|---|---|
| 1 | 98.68 | 3.95 | 2.5 | 17.70 | 43.02 | 25.74 | 12.87 | 0.66 |
| 2 | 98.92 | 3.86 | 3.5 | 16.10 | 39.14 | 29.64 | 14.82 | 0.29 |
| 3 | 98.79 | 3.98 | 4.0 | 15.45 | 37.55 | 31.33 | 15.67 | 0.0 |

TABLE XXXVII

Composition for a Stock Solution of Dicamba Salt, which was Subsequently Diluted with Appropriate Amounts of Propylene Glycol and/or Water for Achieving the Targeted Glycol-to-Dicamba Molar Ratio Together with the Targeted Glycol-to-Water Weight Ratio

| | Ingredient, Weight % | | | |
|---|---|---|---|---|
| | Dicamba Solid, 98.3% Active | Deionized Water | 50 Wt. % Sodium Hydroxide | Propylene Glycol |
| Sodium salt of Dicamba (50% Neutralization of Dicamba) | 45.79 | 7.34 | 8.15 | 38.73 |

Example 23

This example shows the beneficial effect of a diol, propylene glycol, on lowering the volatility of dicamba, for non-water-continuous microemulsion compositions, comprising acetochlor and dicamba. Selected microemulsion compositions prepared in accordance with Example 4 were diluted with water to a dicamba concentration of 1.2 wt. %.

TABLE XXXVIII

| Comp. No. from Example 4 | Propylene Glycol-to-Dicamba Molar Ratio | pH of Test Solution | Volatility Reduction % |
|---|---|---|---|
| 4-1 | 2.5 | 2.96 | — |
| 4-2 | 3.5 | 2.96 | 22.5 |
| 4-3 | 4 | 3.04 | 39.4 |

Example 24

This example shows the beneficial impact of diols such as propylene glycol and hexylene glycol, on lowering the volatility of dicamba, for non-water-continuous microemulsion compositions, comprising acetochlor and dicamba. Selected microemulsion compositions prepared in accordance with Example 16 were diluted with water to a dicamba concentration of 1.2 wt. %. The diluted compositions were subjected to dicamba volatility testing by the procedure described in Example 23. The results of the volatility tests are shown in Table XXXIX below. The results are presented as a percent volatility reduction relative to Comp. No. 16-5.

TABLE XXXIX

| Comp. No. from Example 16 | Glycol-to-Dicamba Molar Ratio | pH of Test Solution | Volatility Reduction % |
|---|---|---|---|
| 16-5 | 1.2 | 3.4 | — |
| 16-6 | 2.4 | 3.4 | 25.6 |
| 16-7 | 4 | 3.4 | 26.1 |

Example 25

This example shows the effect of the glycol structure, i.e., branched versus linear, for C3 (carbon atoms) and C4 glycols, on auxin herbicide volatility under low pH. Non-water-continuous herbicidal microemulsion compositions were prepared in accordance with the General Formulation Procedure. Details of the compositions are presented in Table XL. The compositions of the dicamba salt solutions used in preparing the microemulsion compositions are given in Table XLI. The compositions were diluted with amounts of a glycol and/or water to achieve ae targeted glycol-to-dicamba molar ratio together with a targeted glycol-to-water weight ratio of approximately 0.7. These compositions were then diluted with water to a dicamba concentration of 1.2 wt. %. The diluted compositions were subjected to dicamba volatility testing by the procedure described in Example 23. The results of the volatility tests showed that the volatility for compositions containing branched glycols was was consistently lower versus linear for C3 and C4 glycols.

TABLE XLI

| Ingredient | Weight % |
|---|---|
| Dicamba Tech | 52.9 |
| 1,2-Propylene Glycol | 22.4 |
| 50% NaOH | 9.4 |
| Water | 15.3 |

Example 26

This example shows the effect on residual weed control by incorporating a cationic polymer. A non-water-continuous herbicidal microemulsion composition was prepared in accordance with the General Formulation Procedure. Details of the compositions are presented in Table XLII. The compositions of the dicamba salt solutions used in preparing the microemulsion compositions are given in Table XXLIII. Cationic guar was added to the dicamba solution.

TABLE XLII

| Wt. % of Acetochlor (96.1%) | Wt. % of Safener | Wt. % of Dicamba Solution | Wt. % of 2-Ethyl Hexanol | Wt. % of Surfactant (82% Active): Ethoxylated Phosphate Ester in Acid Form |
|---|---|---|---|---|
| 38.56 | 6.75 | 31.70 | 10.50 | 12.50 |

TABLE XLIII

| Dicamba Salt Solution | Dicamba Solid, 98.3% Active | Deionized Water | 50 Wt. % NaOH | Propylene Glycol | 3.27% Cationic Guar Solution in Water |
|---|---|---|---|---|---|
| Sodium salt of Dicamba (61% Neutralization of Dicamba) | 45.37 | 15.37 | 8.04 | 31.22 | |
| Above Dicamba Solution | | 99.32 | | | 0.68 |

An application mixture was prepared from this microemulsion composition by diluting with water. The application mixture was sprayed onto a plot containing palmer

TABLE XL

| Comp. No. | pH | Glycol-to-Dicamba Molar Ratio | Wt. % of Dielectricity Modifier (2-Ethyl Hexanol) | Wt. % of Acetochlor (96.1%) | Wt. % of Dicamba Solution | Wt. % of Surfactant (82% Active): Ethoxylated Phosphate Ester in Acid Form | Glycol |
|---|---|---|---|---|---|---|---|
| 1 | 4.26 | 3.5 | 16.17 | 39.29 | 29.69 | 14.85 | 1,3 Propanediol (Linear) |
| 2 | 4.31 | 3.5 | 16.17 | 39.29 | 29.69 | 14.85 | 1,2 Propanediol (Branched) |
| 3 | 4.19 | 3.5 | 15.57 | 37.84 | 31.06 | 15.53 | 1,4 Butanediol (Linear |
| 4 | 4.18 | 3.5 | 15.57 | 37.84 | 31.06 | 15.53 | 1,3 Butanediol (Branched) | amaranth. Weed control at 46 days after treatment was approximately 70% with the test application mixture as compared to a weed control of approximately 60% for the same application mixture but not containing the cationic guar additive and approximately 45% for a tank mixture of the two herbicides (also not containing the cationic guar additive).

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A stable herbicidal composition comprising:
    an oil phase comprising an acetamide herbicide, wherein the acetamide herbicide is selected from the group consisting of acetochlor, alachlor, butachlor, delachlor, dimethachlor, dimethenamid, dimethenamid-P, metazochlor, metolachlor, S-metolachlor, pretilachlor, pronamide, propachlor, propisochlor, terbuchlor, and xylachlor, esters thereof, and mixtures thereof;
    an aqueous phase comprising an aqueous solution comprising an auxin herbicide component comprising an anion of an auxin herbicide and a salt-forming cation, wherein the auxin herbicide is selected from the group consisting of dicamba; 2,4-dichlorophenoxyacetic acid (2,4-D); 4-(2,4-dichlorophenoxy) butyric acid (2,4-DB); dichloroprop; 2-methyl-4-chlorophenoxyacetic acid (MCPA); 4-(4-chloro-2-methylphenoxy) butanoic acid (MCPB); 4-chlorophenoxyacetic acid; 2,4,5-trichlorophenoxyacetic acid (2,4,5-T); aminopyralid; clopyralid;
    fluroxypyr; triclopyr; mecoprop; picloram; quinclorac; aminocyclopyrachlor; and mixtures thereof, and;
    a $C_2$ to $C_{10}$ glycol, and the composition further includes at least one of features (i)-(iv):
    (i) a pH that is no greater than about 6;
    (ii) a 1 wt. % auxin herbicide acid equivalent dilution of the composition having a pH that is no greater than about 4;
    (iii) a molar ratio of the salt-forming cation to the anion of the auxin herbicide that is no greater than about 0.8:1; and
    (iv) an organic acetamide herbicide diluent and wherein the weight ratio of the acetamide herbicide to the organic acetamide herbicide diluent is at least about 1:10, and wherein:
    the alkylene glycol reduces the volatility of the auxin herbicide and the chemical stability of the auxin herbicide is characterized by a recovery of at least about 90 weight % of the auxin herbicide after storage of the composition at 40° C. for 6 weeks.

2. The herbicidal composition of claim 1 wherein a 1 wt. % auxin herbicide acid equivalent dilution of the composition has a pH that is no greater than about 3.75.

3. The herbicidal composition of claim 1 wherein the herbicidal composition includes at least two of the features of (i), (ii), (iii), and (iv).

4. The herbicidal composition of claim 1 wherein the pH is from about 3 to about 6.

5. The herbicidal composition of claim 1 wherein a 1 wt. % auxin herbicide acid equivalent dilution of the composition has a pH from about 2 to about 4.

6. The herbicidal composition of claim 1 wherein the molar ratio of the salt-forming cation to the anion of the auxin herbicide is from about 0.2:1 to about 0.8:1.

7. The herbicidal composition of claim 1 wherein the $C_2$ to $C_{10}$ glycol is selected from the group consisting of propylene glycol; hexylene glycol; and mixtures thereof.

8. The herbicidal composition of claim 1 wherein the organic acetamide herbicide diluent comprises at least one compound selected from the group consisting of 2-ethyl-1-hexanol, 2-ethylhexane-1,3-diol, tetradecane, pentadecane, hexadecane, oleyl alcohol, octocryelene, and mixtures thereof.

9. The herbicidal composition of claim 1 wherein the auxin herbicide is selected from the group consisting of dicamba; 2,4-dichlorophenoxyacetic acid (2,4-D); and mixtures thereof.

10. The herbicidal composition of claim 1 wherein the salt-forming cation comprises a cation of an amine, an alkali metal, or mixture thereof.

11. The herbicidal composition of claim 1 wherein the composition has a total herbicide loading of at least about 10 wt. %.

12. The herbicidal composition of claim 1 wherein the acetamide herbicide is selected from the group consisting of acetochlor, alachlor, metolachlor, S-metolachlor, and mixtures thereof.

13. The herbicidal composition of claim 1 wherein the herbicidal composition includes at least three of the features of (i), (ii), (iii), and (iv).

14. The herbicidal composition of claim 1 wherein the $C_2$ to $C_{10}$ glycol is selected from the group consisting of propylene glycol; hexylene glycol; 1,3-propanediol; 1,4-butanediol; 1,3-butanediol; and mixtures thereof.

15. A method for controlling weeds in a field, the method comprising:
    applying the herbicidal composition of claim 1, or dilution thereof to the field in an herbicidally effective amount.

* * * * *